US006404988B1

(12) United States Patent
Tanabe

(10) Patent No.: US 6,404,988 B1
(45) Date of Patent: Jun. 11, 2002

(54) CAMERA

(75) Inventor: Minoru Tanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,854

(22) Filed: Jun. 20, 2000

(30) Foreign Application Priority Data

Jun. 19, 1999 (JP) ........................................... 11-180632
Jun. 25, 1999 (JP) ........................................... 11-180631

(51) Int. Cl.⁷ ........................... G03B 15/03; G03B 17/04
(52) U.S. Cl. ......................... 396/62; 396/175; 396/177; 396/349
(58) Field of Search ........................... 396/62, 175, 177, 396/176, 178, 349

(56) References Cited

U.S. PATENT DOCUMENTS

| 4,261,658 A | * | 4/1981 | Uchiyama et al. ........... 396/178 |
| 4,951,074 A | * | 8/1990 | Ueda ........................... 396/62 |
| 5,012,262 A | * | 4/1991 | Mogamiya et al. ........... 396/62 |
| 5,335,030 A | * | 8/1994 | Suzuka .................... 396/175 X |
| 5,694,627 A | * | 12/1997 | Taguchi et al. .............. 396/175 |
| 5,749,003 A | * | 5/1998 | Tanabe ........................ 396/177 |
| 5,966,551 A | * | 10/1999 | Haraguchi et al. ........ 396/62 X |
| 6,072,954 A | * | 6/2000 | Onda ........................ 396/62 X |

* cited by examiner

Primary Examiner—W. B. Perkey
(74) Attorney, Agent, or Firm—Robin, Bleccker & Daley

(57) ABSTRACT

A camera includes a flash light emitting part arranged to be movable between a stowed position and a usage position, a first lever member arranged to swing in such a way as to cause the flash light emitting part to move from the stowed position to the usage position and from the usage position to the stowed position, a second lever member arranged to swing in such a way as to vary an illuminating angle of the flash light emitting part by moving a part of the flash light emitting part, when the flash light emitting part is in the usage position, and a rotating member arranged to rotate according to movement of a lens barrel, wherein a first engaging part arranged to engage the first lever member and a second engaging part arranged to engage the second lever member are formed at the rotating member.

21 Claims, 18 Drawing Sheets

CAMERA

BACKGROUND OF THE INVENTION

1. Field of the Invention

The present invention relates to a camera arranged to be capable of driving a flash device to move to protruded and stowed positions and to vary the illuminating angle of the falsh device.

2. Description of Related Art

Cameras having built-in flash devices have been variously developed. Meanwhile, efforts to reduce the size of cameras have advanced during recent years. The reduction in size of a camera shortens a distance between the optical axis of a photo-taking lens and the optical axis of a flash device. In addition, the zoom ratio of the photo-taking lens has increased. The increase in zoom ratio tends to cause an increase of a distance between the camera and an object of shooting (such as a person of the like), i.e., the so-called photo-taking distance.

Under the above-stated condition, the reflection of illumination light of the flash device is apt to be made incident on the pupil of a person who is the object of shooting and to be reflected by the retina of the person, thereby causing the so-called red-eye phenomenon. It has become important to suppress the red-eye phenomenon.

To suppress the red-eye phenomenon, some of known cameras are arranged to have a flash device preliminarily emit light or some light source (lamp) other than a flash device emit light in such a way as to contract the pupil of the object (person) immediately before taking a shot.

According to another known method, a camera is provided with the so-called pop-up flash device which is arranged to move its light emitting part away from the optical axis of a photo-taking lens in using the flash device. The flash device is arranged to be stowed inside of the camera body when the camera is not used for photo-taking. Therefore, this method not only effectively suppresses the red-eye phenomenon but also enhances the portability of the camera.

Meanwhile, some of known cameras are arranged to vary the illuminating angle of a flash device according to changes taking place in focal length of a photo-taking lens (the variation of magnification), for efficient use of the light energy of the flash device.

Generally, the illuminating angle of a flash device is considered to be sufficient if it covers the angle-of-view range of the camera. In the case of a camera in which the illuminating angle of a flash device is not variable from one angle to another, the illuminating angle is set to cover an angle of view obtained at the focal length of the wide-angle end position of a photo-taking lens having variable focal lengths. Therefore, in such a case, the illuminating angle of the flash device remains at the angle covering the angle of view of the wide-angle end position even when the focal length of the photo-taking lens is shifted to a telephoto position. Further, the guide number of a flash device is fixed irrespective of the focal length of the photo-taking lens in general. Therefore, the guide number of a flash device is determined by a shootable distance at a telephoto end position where a photo-taking lens generally has a large F-number. As a result, the flash device is allowed to emit light at the illuminating angle covering the photo-taking angle of view obtained at the wide-angle end even in a case where a shot is to be taken at the telephoto end position. In such a case, a portion of the light energy emitted to the outside of the range of the photo-taking angle of view is not used and is thus wasted.

In the case of such a camera that is incapable of varying the illuminating angle of a flash device while the focal length of a photo-taking lens is variable, the flash device must be arranged to have the illuminating angle required on the side of the wide-angle end position and also to meet the requirement for the shootable distance on the side of the telephoto end position of the photo-taking lens. In a case where the zoom ratio of the photo-taking lens is large and the photo-taking lens has a large F-number, the flash device must be arranged to have a large guide number accordingly.

However, a larger guide number requires a larger amount of electric energy. Therefore, the sizes of parts of the flash device such as a charging capacitor, a flash tube, etc., become larger to eventually cause an increase in size of the camera. Besides, when the size of the charging capacitor becomes larger, the length of charging time also increases. Then, in continuously taking shots by using the flash device, the length of time of waiting for completion of charging becomes too long, thereby impairing the quick shooting.

To solve this problem, the illuminating angle of a flash device is arranged to be variable according to the focal length of the photo-taking lens as mentioned above. This method permits efficient use of the light energy for taking a shot at a telephoto position without increasing the size of the camera and without necessitating a long period of time for waiting completion of a charging action.

Further, some of known cameras have a flash device arranged by combining the pop-up type and the type having a variable illuminating angle. However, according to this arrangement, the flash device is arranged in most cases to be manually popped up. For stowing the flash device, a light emitting part which is under an urging force of a spring urging the light emitting part to move in the direction of protruding is held at a stowed position by a lock means. In using the flash device, the user of the camera is required to cause the light emitting part to pop up by unlocking the lock means. The flash device is, therefore, not so good in operability.

Another known camera has a cam arranged to be driven by a gear train provided for driving a photo-taking lens barrel and is arranged to protrude a flash device outward from a camera body by means of the cam and a cam follower. The camera is further arranged to have a light emitting part to be movable back and forth within the casing of the flash device in such a way as to vary an illuminating angle by varying a distance between the light emitting part and a convex lens disposed in front of the light emitting part.

The camera which is thus arranged to protrude the flash device outward from the camera body is provided with a cam plate which is arranged to move along with the movement of the photo-taking lens barrel in the direction of an optical axis. The cam plate is arranged to be used for driving a viewfinder and the light emitting part of the flash device to move together.

In the camera of this kind, however, the moving cam plate and the light emitting part must be arranged to reliably engage each other. This requirement imposes some limitation on the protrudable extent of the flash device and also necessitates the cam plate to be large in size. The arrangement of the camera of this kind thus does not permit efficient space utilization.

Further, the arrangement for driving the viewfinder and the light emitting part by means of a common member imposes some restriction in allocating them. Besides, since the action of moving the flash device between its stowed position and its protruded position and the action of varying the illuminating angle of the flash device necessitate use of interlocking members arranged separately from each other. The arrangement, therefore, increases the number of parts and thus causes an increase in cost.

As regards a mechanism for moving a flash device from its stowed position in the upper part of a camera to the external side of the camera, it is conceivable to connect the flash device to the upper part of a lever member which vertically extends within the body of the camera. The lever member is arranged to be swingable on its lower part, i.e., on an axis extending in parallel with the direction of an optical axis. The flash device is thus arranged to be slidingly driven by swinging the lever member.

However, such a flash-device driving mechanism necessitates a large space within the camera body and thus hinders efforts to reduce the size of the camera.

Another known camera disclosed in Japanese Laid-Open Patent Application No. Hei 10-104696 is arranged to move a flash device between a protruded position and a stowed position in association with the movement of a photo-taking lens barrel in the direction of an optical axis and to vary the illuminating angle of the flash device by moving a flash discharge tube in association with a zooming action of the photo-taking lens barrel.

According to that arrangement, with a driving gear train arranged to move the photo-taking lens barrel in the direction of the optical axis, the photo-taking lens barrel and the flash device are caused to make interlocked motions by distributing a driving force at an intermediate part of the gear train to a cam member which is provided for moving the flash device between the protruded and stowed positions and for moving the flash discharge tube.

However, the cam member is a rotating cam which has a protruded/stowed position driving area and a flash-discharge-tube driving area continuously formed on a cam surface on its periphery to be used according to rotation angles. Therefore, the arrangement is such that the cam member is allowed to make approximately only one turn for a cam follower. Thus, the arrangement imposes a severe restriction on design work in respect of a driving force and a space.

Further, according to that arrangement, power is transmitted to interlocked parts provided for the flash-device protruding and stowing actions even when the position of the cam member is within the flash-discharge-tube driving area. Such power transmission increases a load caused by a spring which is provided for position restriction. Besides, it is difficult to move the flash discharge tube to a sufficient extent. The illuminating angle is, therefore, not sufficiently variable. The guide number is also not sufficiently variable. Therefore, according to that arrangement, it has been hardly possible to obtain an adequate guide number when the photo-taking lens is at a telephoto position.

Meanwhile, in a case where a photo-taking lens barrel is arranged to be driven with a motor and a gear train, gears which are normally in mesh with each other might slip due to deformation or the like when an excessive load is imposed on the photo-taking lens barrel.

Particularly in a case where a worm gear is used at an intermediate point in a reduction gear train, if the photo-taking lens barrel is pushed or pulled in the direction of its optical axis while a motor is at rest, an excessive load is imposed on intermeshing gears with the worm gear in a state of being unable to rotate.

To prevent such an excessive load from being imposed on gears, some of known cameras are provided with a slip mechanism which is arranged to make a slip when an excessive load greater than a predetermined amount of load is imposed on a part of a gear train.

When this slip mechanism works, a gear train from a motor to the slip mechanism and another gear train from the slip mechanism to a photo-taking lens barrel come to deviate from an initial phase relation. With a camera provided with such a slip mechanism, in moving the light emitting part of a flash device or in varying the illuminating angle of a flash device by using a gear train which branches from a photo-taking-lens-barrel driving gear train at an intermediate point of the gear train, the phase of the protruded or stowed position of the light emitting part or that of an illuminating angle of the flash device must be adjusted to the phase of the position in the direction of an optical axis or that of the focal length of a photo-taking lens.

If the above-stated phase deviation takes place while the camera is in operation, there would arise such a problem that the flash device fails to be at the protruded position despite the photo-taking lens barrel being at a photo-taking position, or fails to be not completely set at the stowed position despite the photo-taking lens barrel being at its stowed position.

Further, if a deviation of phase takes place between the focal length position of the photo-taking lens and the illuminating angle of the flash device, either the angle of view of the photo-taking lens cannot be covered by the illuminating angle of the flash device or light of the flash device cannot be completely converged over the whole illuminating angle with the focal length of the photo-taking lens at a telephoto position and thus a prescribed guide number cannot be fulfilled. An under-exposure state tends to result from such a condition.

BRIEF SUMMARY OF THE INVENTION

In accordance with one aspect of the invention, there is provided a camera, comprising a flash light emitting part arranged to be movable between a stowed position and a usage position, a first lever member arranged to swing in such a way as to cause the flash light emitting part to move from the stowed position to the usage position and from the usage position to the stowed position, a second lever member arranged to swing in such a way as to vary an illuminating angle of the flash light emitting part by moving a part of the flash light emitting part, when the flash light emitting part is in the usage position, and a rotating member arranged to rotate according to movement of a lens barrel, wherein a first engaging part arranged to engage the first lever member and a second engaging part arranged to engage the second lever member are formed at the rotating member, so that the size of the camera can be reduced.

The above and other aspects of the invention will become apparent from the following detailed description thereof taken in connection with the accompanying drawings.

DETAILED DESCRIPTION OF THE INVENTION

Hereinafter, a preferred embodiment of the invention will be described in detail with reference to the drawings.

Figure 1:
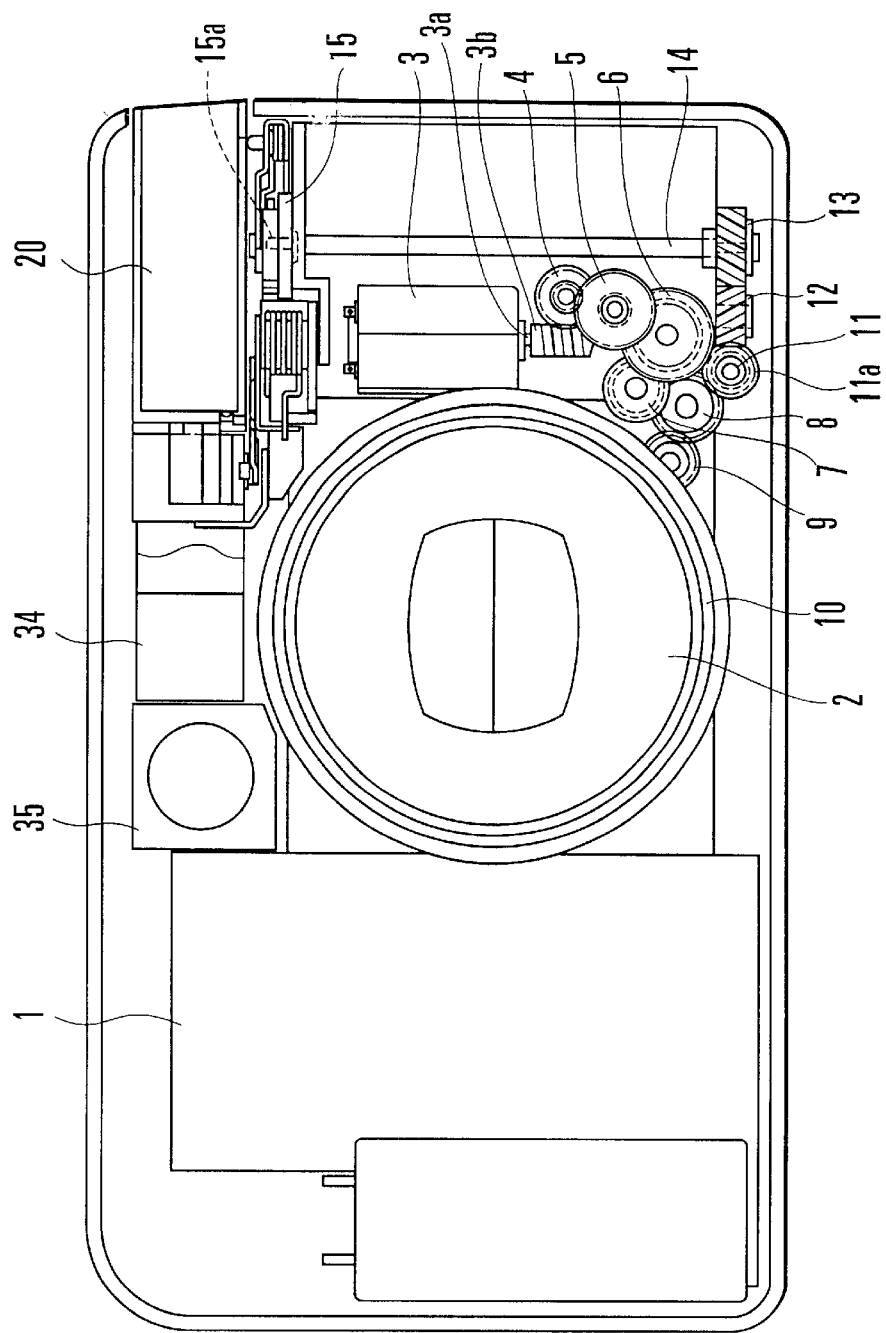
FIG. 1 is a front view showing a camera, according to an embodiment of the invention, in a state in which a flash light emitting part is located at a stowed position.
Figure 2:
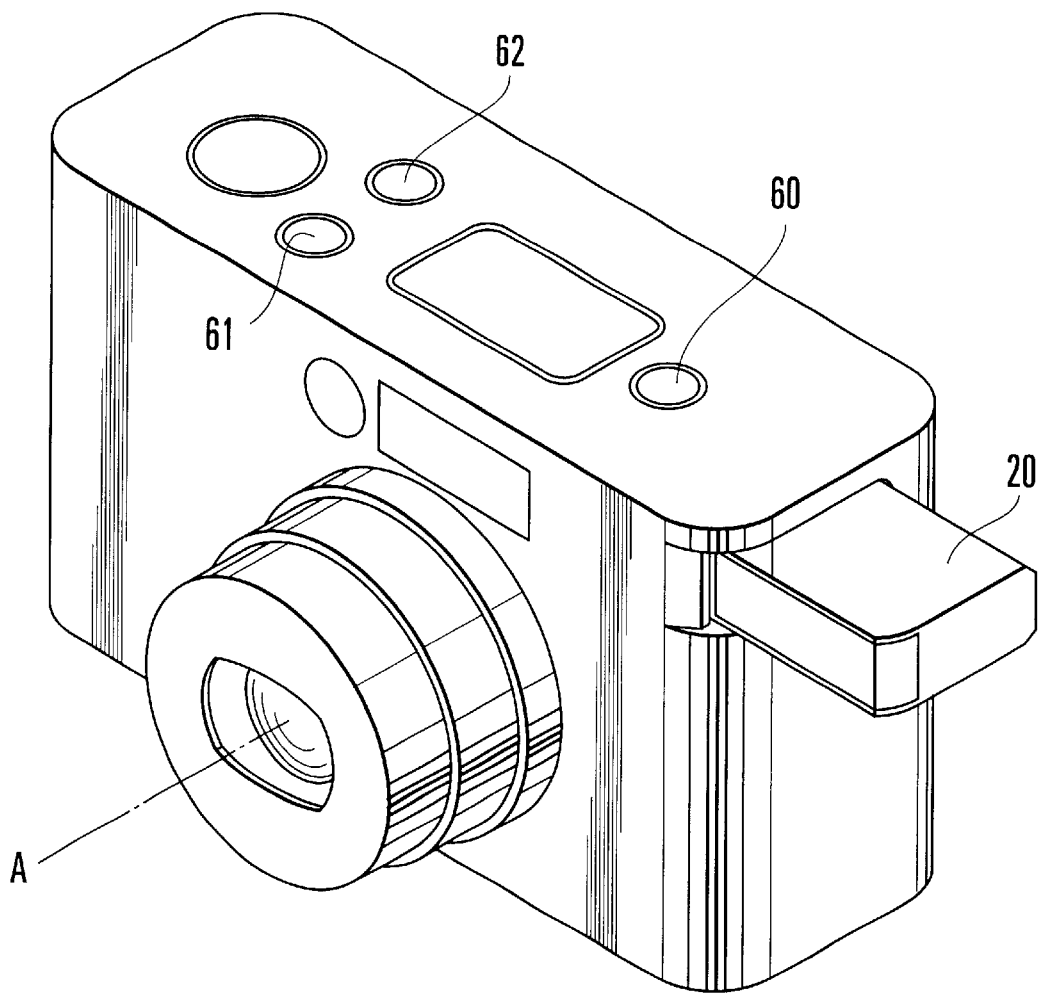
FIG. 2 is a perspective view showing the appearance of the camera in a state in which the flash light emitting part is located at a protruded position.
Figure 3:
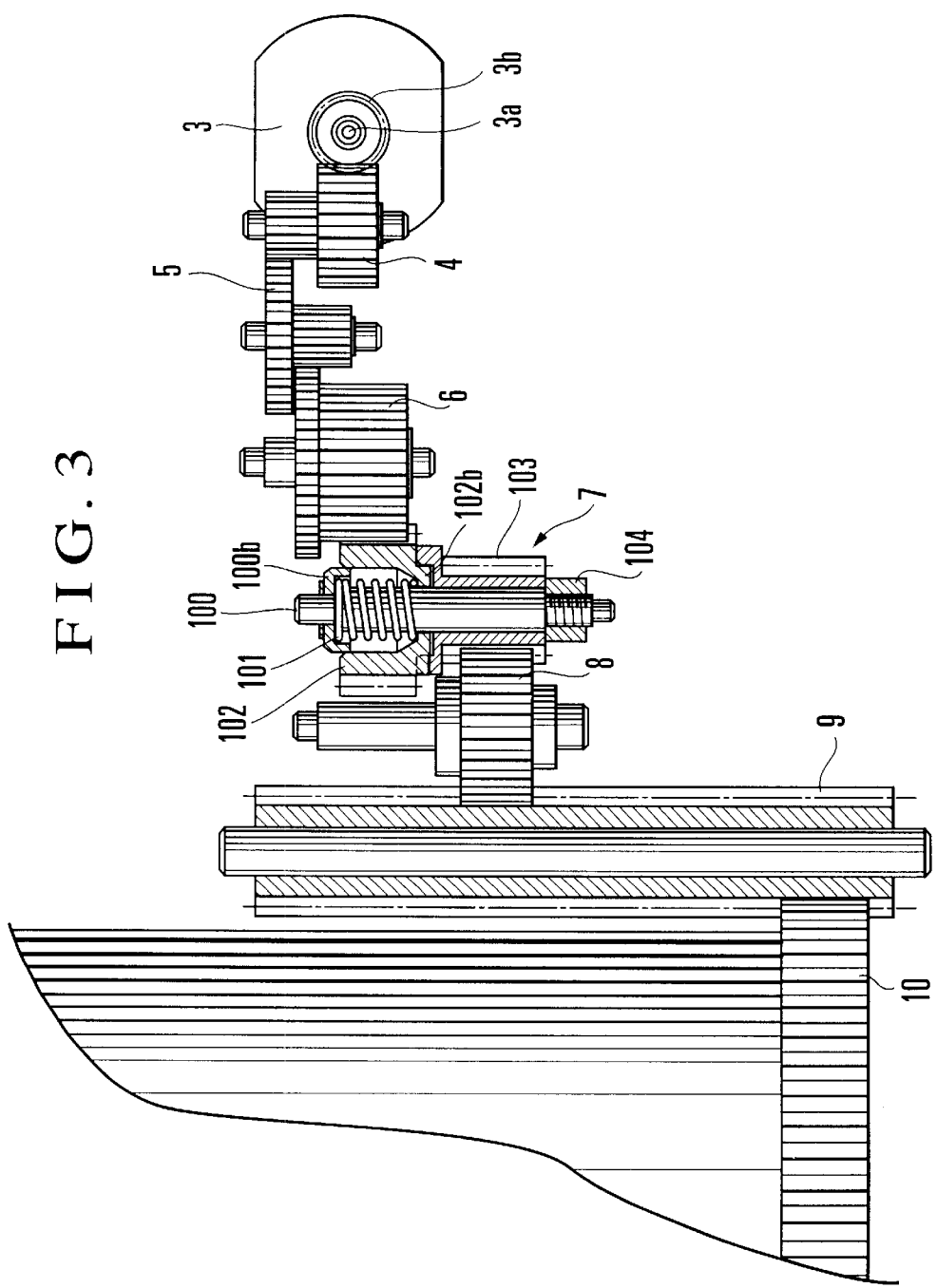
FIG. 3 is a diagram showing gears arranged to drive a photo-taking lens barrel and the flash light emitting part of the camera, as viewed from the bottom of the camera.
Figure 4:
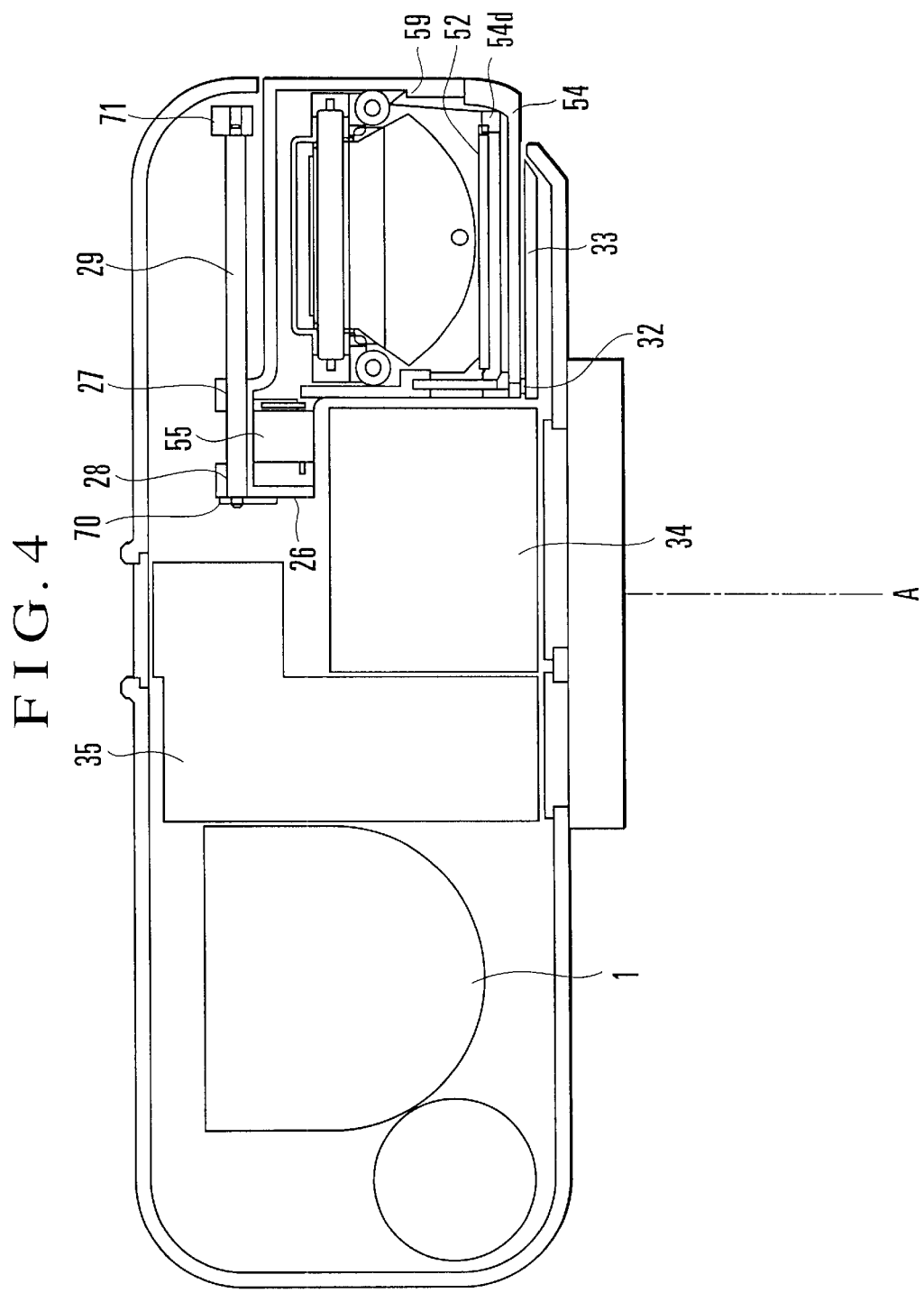
FIG. 4 is a plan view showing the camera in a state in which the flash light emitting part is located at the stowed position.
Figure 5:
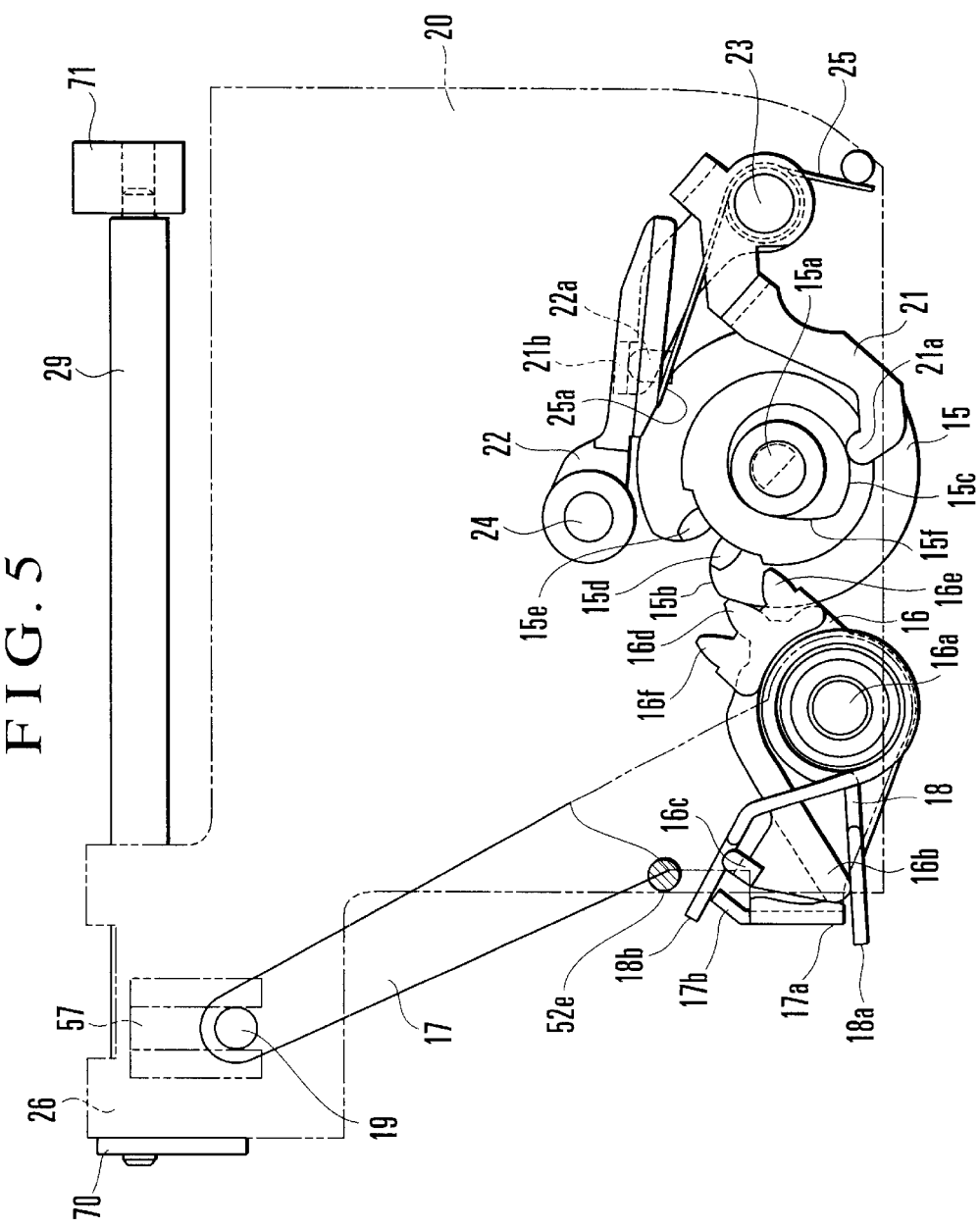
FIG. 5 is a plan view showing the allocation of a flash-device driving member in the camera.

FIGS. 1 to 5 show a camera having a built-in flash device according to the embodiment of the invention. FIG. 1 is a front view showing the camera in a state in which a flash light emitting part is located at a stowed position. FIG. 2 is a diagram showing the appearance of the camera in a state in which the flash light emitting part is located at a protruded position. FIG. 3 is a diagram showing gears arranged to drive a photo-taking lens barrel and the flash light emitting part of the camera, as viewed from the bottom of the camera. Further, in FIG. 3, to make the illustration easily understandable, the gears are shown with their wheel bases developed and their positions shifted in the axial direction. FIG. 4 is a top view showing the camera in a state in which the flash light emitting part is located at the stowed position. FIG. 5 is a top view showing the allocation of members arranged to drive the flash light emitting part, as viewed from above the camera. In FIGS. 2 and 4, reference symbol A denotes an optical axis of the photo-taking lens.

The flash light emitting part of the camera according to the embodiment is disposed on the upper part of a camera body and is arranged to protrude sideways from one side of the camera when the camera is used.

Referring to FIG. 1, the camera includes the camera body 1, a photo-taking lens barrel 2 and the flash light emitting part 20. The flash light emitting part 20 is arranged to protrude from one minor side of the camera body 20 by sliding when the flash light emitting part 20 is to be used. A motor 3 has a worm gear 3b mounted on its driving shaft 3a. The worm gear 3b is in mesh with a worm wheel 4 and is arranged to transmit power to reduction gears 5, 6, 7, 8 and 9. These reduction gears 5 to 9 are rotatably supported by shafts which are mounted on the camera body 1 in parallel with the optical axis of the photo-taking lens. The rotation of the motor 3 is thus transmitted to a driving ring 10 mounted on the photo-taking lens barrel 2, so as to drive the driving ring 10.

When the driving ring 10 is driven by the reduction gears 5 to 9, photo-taking lens groups (not shown) disposed within the photo-taking lens barrel 2 are caused to move in the direction of the optical axis A. The photo-taking lens groups are moved in the direction of the optical axis by a known ordinary arrangement using a cam groove and a cam follower. For example, the arrangement includes a cam ring which rotates in association with the rotation of the driving ring 10, and a holding frame which has a cam follower engaging a cam groove formed in the cam ring and is arranged to be caused to move in the direction of the optical axis by the rotation of the cam ring.

The photo-taking lens barrel 2 is provided with a position detecting means for detecting information on the focal length and a control means for control over an exposure. These parts of the photo-taking lens barrel 2 are connected to a control circuit (not shown) which is disposed inside the camera body 1.

Figure 18:
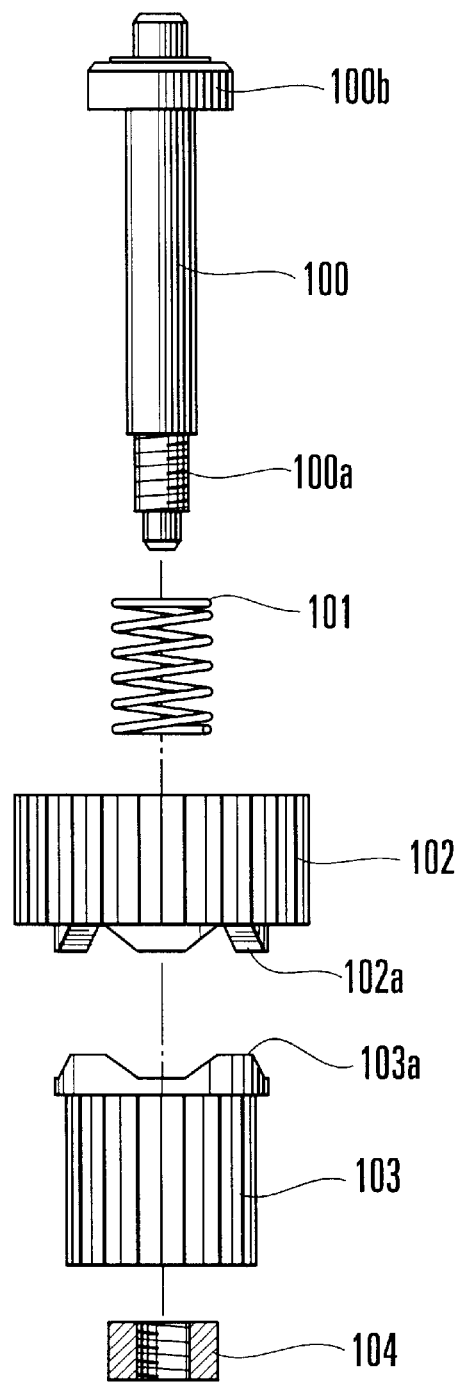
FIG. 18 is an exploded view showing a clutch gear in the camera.

The reduction gears 5 to 9 include a clutch gear 7. The arrangement of the clutch gear 7 is described with reference to FIGS. 3 and 18 as follows. As shown in FIGS. 3 and 18, the clutch gear 7 is composed of a shaft 100, a friction spring 101, a first clutch gear 102, a second clutch gear 103 and a nut 104.

Referring to FIGS. 3 and 18, the shaft 100 has a screw part 100a formed at its lower end part. The shaft 100 is inserted through the friction spring 101 and the first and second clutch gears 102 and 103. The nut 104 is then mounted on the lower end part of the shaft 100. With the nut 104 thus mounted, the friction spring 101 is interposed and charged in between a receiving surface 102b of the first clutch gear 102 formed inside the first clutch gear 102 and a flange 100b of the shaft 100.

The confronting surfaces of the first and second clutch gears 102 and 103 are formed to have convex and concave surfaces 102a and 103a by connecting high and low flat surfaces with slanting surfaces. A load is imposed on the convex and concave surfaces 102a and 103a by the charging force of the friction spring 101 in the direction of causing them to be in mesh with each other.

For a normal operation, the power required for driving the photo-taking lens barrel 2 is transmitted by the intermeshing state of the convex and concave surfaces 102a and 103a. However, in a case where an excessive torque (load) greater than a predetermined value is applied, the first clutch gear 102 comes to move upward, as viewed in FIG. 3, against the charging force of the friction spring 101. Then, the convex and concave surfaces 102a and 103a override the crest parts of each other and the power is no longer transmitted. In other words, when a load exceeding the predetermined value is imposed on the photo-taking lens barrel 2, the second clutch gear 103 comes to slip over the first clutch gear 102. Therefore, other gears can be saved from having any excessive load imposed on them so that the gears can be prevented from being deformed or damaged.

Figure 17:
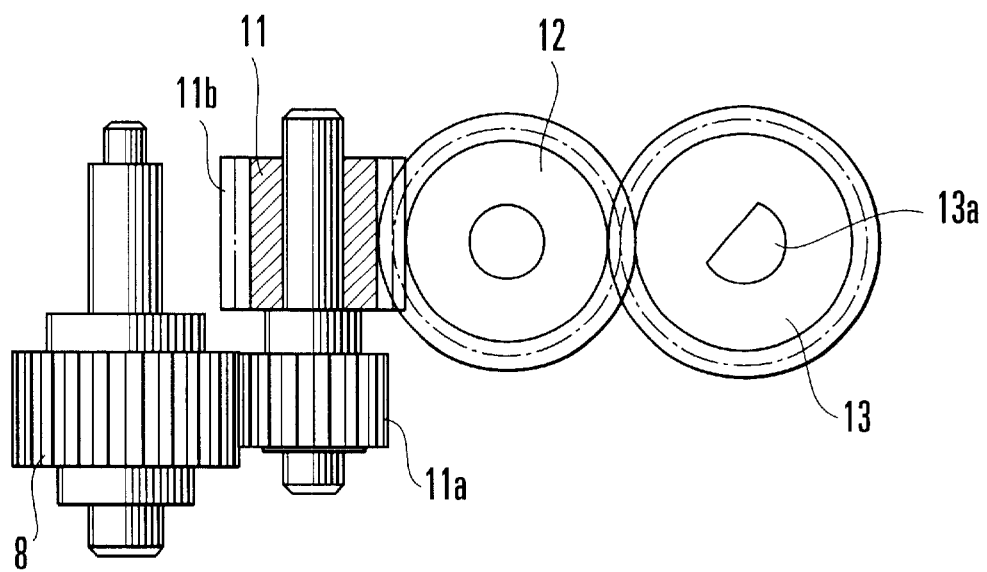
FIG. 17 is a diagram showing gears arranged to drive the flash light emitting part, as viewed from below.

FIG. 17 shows gears 11, 12 and 13 arranged to drive the flash light emitting part 20, as viewed from the lower side of the camera. Similarly to the reduction gear train (gears 5 to 9), the gear 11 is supported by the camera body 1 to be rotatable on a shaft which is parallel with the optical axis of the photo-taking lens. The gears 12 and 13 are helical gears which are located at a lower part of the camera body 1 and are arranged to be rotatable on shafts which extend in the direction perpendicular to the optical axis of the photo-taking lens, i.e., in the vertical direction of the camera body 1.

The gear 11 is composed of a spur gear 11a and a worm 11b and is arranged to be driven with the spur gear 11a engaging the reduction gear 8. Further, the reduction gear 8 is arranged to transmit power to the driving ring 10 by meshing with the second clutch gear 103 of the clutch gear 7 and further meshing with the reduction gear 9.

The gear 11 is thus arranged to mesh with the gear 8 which is an intermediate gear between the clutch gear 7 and the photo-taking lens barrel 2. In other words, the clutch gear 7 is arranged between the motor 3 and the gear 8 which engages the gear 11 among the gears 5 to 9. This arrangement effectively prevents a phase deviation from taking place between the gear train (gears 11, 12 and 13) which is arranged to drive the flash light emitting part 20 and the gear train (gears 8 and 9) which is arranged to drive the photo-taking lens barrel 2, even in a case where the slip mechanism of the clutch gear 7 comes to work with an excessive load imposed on the photo-taking lens barrel 2.

Therefore, the phase of the action of stowing and protruding the flash light emitting part 20 never deviates from the phase of the action of stowing and drawing-out the photo-taking lens barrel 2 to the wide-angle position. Therefore, the arrangement described above effectively prevents such troubles that the flash light emitting part 20 cannot be completely set at its stowed position while the photo-taking lens barrel 2 has been set at its drawn-in position, or that the flash light emitting part 20 cannot be completely set at the protruded position while the photo-taking lens barrel 2 has been already protruded or drawn out to the wide-angle position.

Further, for the same reason, the arrangement described above effectively prevents such troubles that, in varying the illuminating angle of the flash device, either the angle of view of the photo-taking lens barrel 2 cannot be adequately covered by the illuminating angle of the flash device despite the photo-taking lens being at the wide-angle position, or light of the flash device cannot be completely converged over the whole illuminating angle despite the focal length of the photo-taking lens being at the telephoto position and thus a prescribed guide number cannot be fulfilled so that an under-exposure state tends to result from such a condition.

Next, referring to FIG. 17, the worm gear 11b which is formed integrally with the spur gear 11a meshes with the helical gear 12, so that the direction of axis of rotation changes from a direction in parallel with the optical axis of the photo-taking lens to a direction perpendicular to the optical axis, i.e., a vertical direction.

The helical gear 12 is in mesh with the helical gear 13. A D-cut hole 13a is formed in the helical gear 13. The lower end part of a shaft 14 which is D-cut at its two ends is fitted into the D-cut hole 13a of the helical gear 13.

The shaft 14 extends through the front side of the camera body 1 and has its upper end part fitted into a D-cut hole 15a formed in a driving cam 15 on the upper side of the camera body 1.

Next, the arrangement of a mechanism for driving the flash light emitting part 20 to move between the protruded position and the stowed position and for varying the illuminating angle of the flash light emitting part 20 is described.

Referring to FIG. 5, the driving cam 15 has a slide cam 15b and a zoom cam 15c. The slide cam 15b is arranged to drive the flash light emitting part 20 to move between the protruded position and the stowed position. The zoom cam 15c is arranged to vary the illuminating angle of the flash light emitting part 20 and is formed at a position different from that of the slide cam 15b in the direction of the axis of rotation. A part of the slide cam 15b in the direction of its circumference is formed as a trough part in an involute curved shape (hereinafter referred to as a lift part). The slide cam 15b further has gear teeth 15d and 15e each having a meshing surface which is of the same involute curved shape as the cam surface at a position overlapping the trough part (lift part) in the direction of the axis of rotation and is continuous from the cam surface. The tooth thickness of each of the gear teeth 15d and 15e is larger than the thickness of the slide cam 15b.

A driving lever 16 is arranged to be driven by the driving cam 15 and is supported by the camera body 1 to be rotatable on a shaft 16a. The driving lever 16 is provided with three gear teeth 16d, 16e and 16f which are arranged to be able to mesh with the gear teeth 15d and 15e of the driving cam 15. Of the three gear teeth 16d, 16e and 16f, the gear teeth 16e and 16f on the two sides of the middle gear tooth 16d are arranged to have a smaller tooth thickness than that of the middle gear tooth 16d. The gear teeth 16e and 16f are thus arranged not to abut on the slide cam 15b. A flash-device driving lever 17 is supported by the camera body 1 to be rotatable also on the shaft 16a similarly to the driving lever 16.

A shaft 19 is mounted on the fore end of the flash-device driving lever 17 in such a way as to face the flash light emitting part 20. The shaft 19 is inserted into the groove of a U-shaped part 57 which is disposed on the lower side of the flash light emitting part 20. The flash light emitting part 20 is slidably fitted on a guide bar 29 extending in the horizontal direction as viewed in FIG. 5 and is arranged to be driven by the swinging motion of the flash-device driving lever 17 through the shaft 19 which is engaging the U-shaped part 57. The flash light emitting part 20 is thus arranged to be movable by the flash-device driving lever 17 in the horizontal direction as viewed in FIG. 5.

Further, the driving cam 15 and the driving levers 16 and 17 are arranged to have their axes of rotating motions located at intermediate points within the range of parallel sliding motions to be made for protruding and stowing the flash light emitting part 20.

When the flash-device driving lever 17 swings, the shaft 19 which engages the U-shaped part 57 causes the flash light emitting part 20 to be driven to slide in the direction of protruding from the camera body 1 or in the direction of being stowed into the camera body 1.

A spring 18 is set around the shaft 16a. When an external force is applied to the flash light emitting part 20 and parts interlocked therewith, the spring 18 acts to prevent these parts from having any excessive load imposed on them. The spring 18 also acts to resiliently urge the flash light emitting part 20 to move toward its protruded position and toward its stowed position. The spring 18 has two arms 18a and 18b. One arm 18a is arranged to abut on a projection 16b of the driving lever 16 and also on a bent part 17a of the flash-device driving lever 17. The other arm 18b is arranged to abut on another projection 16c of the driving lever 16 and also on another bent part 17b of the flash-device driving lever 17 in a state of being charged.

The two arm parts 18a and 18b of the spring 18 are thus arranged to pinch the driving lever 16 and the flash-device driving lever 17 in between them. The driving lever 16 and the flash-device driving lever 17 are thus arranged to be swingable together through the spring 18. The driving cam 15 and the driving lever 16 are interlocked in a manner as will be described later.

In FIG. 5, reference numerals 21 and 22 respectively denote a follower lever and a zoom driving lever, which are provided for varying the illuminating angle of the flash light emitting part 20. The follower lever 21 and the zoom driving lever 22 are rotatably supported respectively by a shaft 23 and a shaft 24 on the camera body 1.

The follower lever 21 has its fore end 21a abutting on the zoom cam 15c of the driving cam 15. A bent part 21b formed at the other end of the follower lever 21 is abutting on the rear part of a shaft 22a provided on the lower side of the zoom driving lever 22.

The zoom driving lever 22 is urged to swing counterclockwise (as viewed in FIG. 5) on the shaft 24 by the fore end 25a of a spring 25 which is mounted on the shaft 23. At the same time, the follower lever 21 is urged to swing clockwise on the shaft 23 by the spring 25 through the shaft 22a. Therefore, the fore end 21a of the follower lever 21 is stably abutting on the zoom cam 15c. When the driving cam 15 rotates, the follower lever 21 swings according to the lift of the zoom cam 15c. Then, the zoom driving lever 22 next comes to swing.

At the zoom cam 15c, a part having a small lift near the center of rotation is a wide-angle position arranged to set an illuminating angle apposite to a wide-angle zoom position of the photo-taking lens (hereinafter referred to as a wide-angle illuminating angle). Another part having a large lift located away from the center of rotation is a telephoto position arranged to set an illuminating angle apposite to a telephoto zoom position of the photo-taking lens (hereinafter referred to as a telephoto illuminating angle). In other words, the wide-angle illuminating angle is obtained when the zoom driving lever 22 comes to horizontally or laterally extend, as viewed in FIG. 5, with the fore end 21a of the follower lever 21 coming to abut on the wide-angle position of the zoom cam 15c. The telephoto illuminating angle is obtained when the zoom driving lever 22 comes to slant downward to the right, as viewed in FIG. 5, with the fore end 21a of the follower lever 21 coming to abut on the telephoto position of the zoom cam 15c.

In the present embodiment, as described above, the mechanism for driving the flash light emitting part 20 to be protruded and to be stowed and the mechanism for driving and varying the illuminating angle are formed with such members (the driving cam 15 and the levers 16, 17, 21 and 22) that are arranged to rotate and swing, on shafts which extend in the vertical direction of the camera body 1, in association with the movement of the photo-taking lens barrel 2 in the direction of the optical axis. These mechanisms are arranged approximately in a plane shape along the lower side of a space provided for stowing the flash device, as shown in FIG. 1. Therefore, these mechanisms can be compactly arranged close to the flash light emitting part 20. The arrangement of the present embodiment thus permits efficient use of spaces within the camera body 1 for reduction in size of the camera.

While the embodiment described above is arranged to form the driving mechanisms by using only such members that rotate and swing on shafts which extend in the vertical direction of the camera body 1, the arrangement may be changed to include some members that rotate or swing on shafts or the like which extend in parallel with the optical axis of the photo-taking lens, so long as the inclusion of such members does not impair the compactness of the camera.

FIG. 5 shows a state obtained when the photo-taking lens barrel 2 is in a drawn-in (stowed) state. When the photo-taking lens barrel 2 is in this state, the flash light emitting part 20 is at the stowed position. Under this condition, no interlocked actions of the zoom driving lever 22 and the flash light emitting part 20 are necessary as no light is emitted from the flash device. Therefore, in the state shown in FIG. 5, the follower lever 21 and the zoom driving lever 22 stay at positions corresponding to a point within a middle focal length area which is a little closer to the telephoto position than the center of the middle focal length area.

Further, the zoom driving lever 22 may be left engaging the telephoto area of the zoom cam 15c without any problem, when the photo-taking lens barrel 2 is at a position within a drawing-in action area, but is arranged to engage an applicable part of the zoom cam 15c when the photo-taking lens barrel 2 is at the wide-angle position or the telephoto position. Since the driving cam 15 is a rotary cam, when the photo-taking lens barrel 2 moves from the wide-angle position to the drawn-in position, the follower lever 21 overrides the telephoto position of the zoom cam 15c moving along a curved part 15f to come to a stop within a part of the zoom cam 15c corresponding to the middle focal length of the photo-taking lens. In other words, an area of the zoom cam 15c on which the follower lever 21 abuts when the photo-taking lens barrel 2 acts between the wide-angle position and the drawn-in position is arranged to overlap in part an area on which the follower lever 21 abuts when the photo-taking lens barrel 2 acts between the wide-angle position and the telephoto position. By virtue of this arrangement, the driving cam 15 can be arranged to have a sufficient angle of rotation.

With the driving cam 15 arranged to have a large angle of rotation, both the slide cam 15b and the zoom cam 15c of the driving cam 15 can be formed in cam shapes having small angles of inclination. Therefore, adequate driving forces can be obtained for driving the flash light emitting part 20 to be protruded and to be stowed and for varying the illuminating angle thereof without increasing sizes of parts.

Next, the arrangement made in the camera body 1 for supporting the flash light emitting part 20 is described. Referring to FIG. 4, the flash light emitting part 20 has a protruding part 26 which protrudes from a rear part of the body of the flash light emitting part 20. The protruding part 26 is provided with guide holes 27 and 28. A guide bar 29 is slidably inserted into the guide holes 27 and 28. The two ends of the guide bar 29 is supported by holders 70 and 71 which are formed on the camera body 1.

A guide plate 33 is arranged to restrain the flash light emitting part 20 from turning around the guide bar 29, by vertically guiding a protruding part 32 disposed at a front portion of the flash light emitting part 20. The flash light emitting part 20 is thus arranged to be movable to the right or to the left, as viewed in FIG. 4, toward the stowed position or the protruded position along the guide bar 29.

In FIG. 4, reference numeral 34 denotes a distance measuring unit, and reference numeral 35 denotes a viewfinder unit. When the flash light emitting part 20 is at the stowed position, the protruding part 26 is made to be located inside a space provided on one side of the viewfinder unit 35 in rear of the distance measuring unit 34. The arrangement thus gives a sufficient width in the moving direction of the flash light emitting part 20 and also suppresses rattling in protruding the flash light emitting part 20. Besides, the arrangement ensures a sufficient strength against external forces.

Further, since the protruding part 26 protrudes from the body of the flash light emitting part 20 toward the inner side of the camera body, the allowable limit of stroke of moving the flash light emitting part 20 can be increased up to such a distance that is equal to the width of the body of the flash light emitting part 20. This arrangement makes it possible to heighten the effect of suppressing the red-eye phenomenon.

Figure 6:
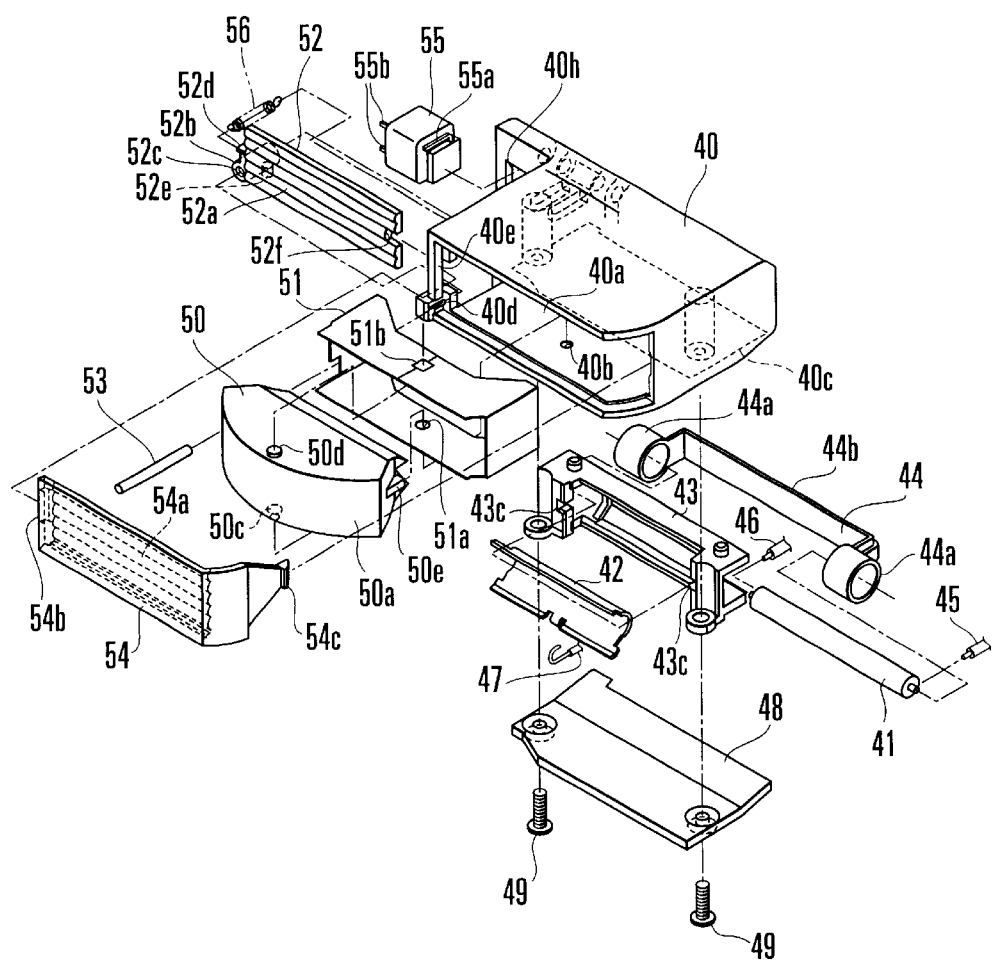
FIG. 6 is an exploded perspective view showing the flash light emitting part.
Figure 7:
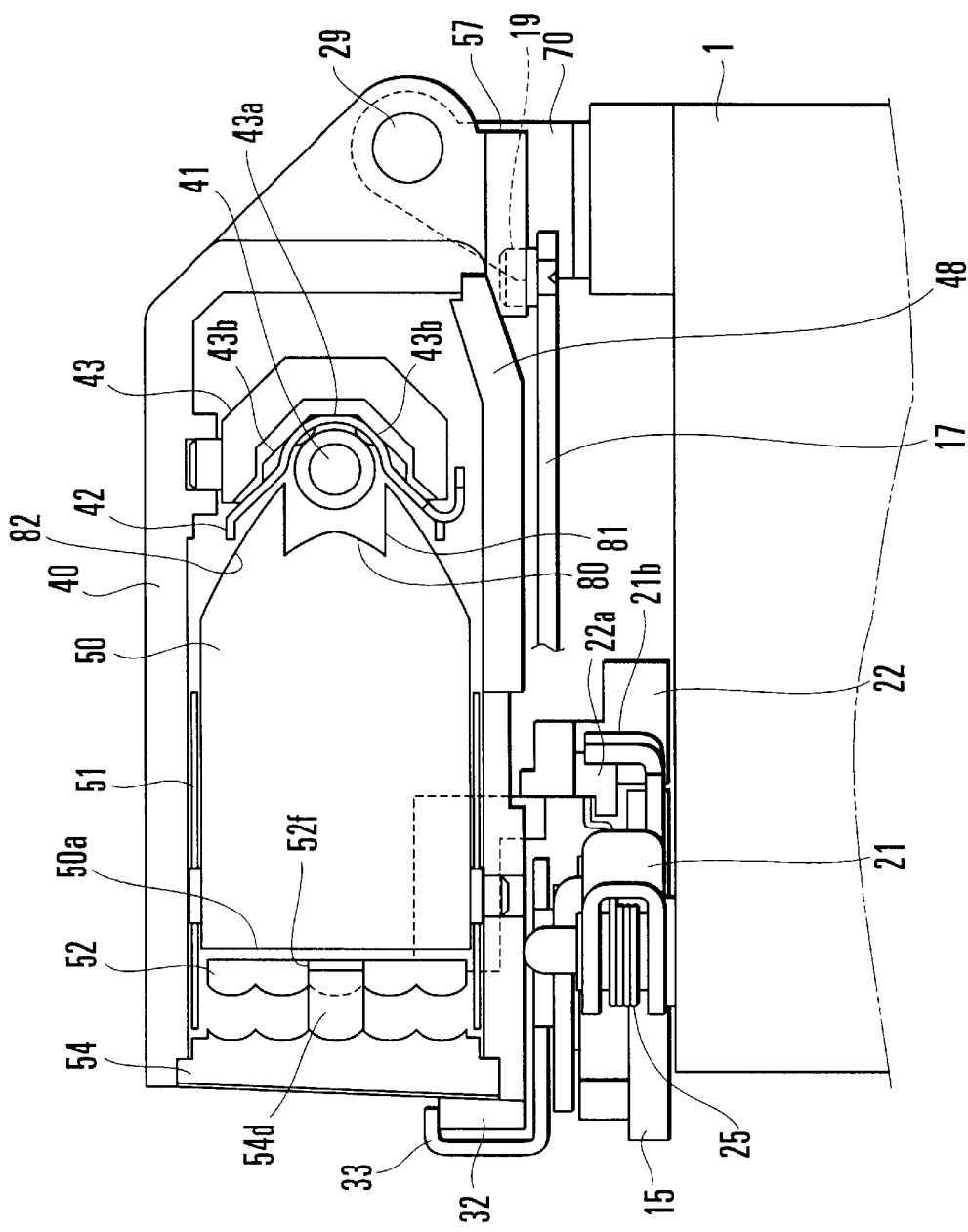
FIG. 7 is a vertical sectional view of the flash light emitting part.

The arrangement of the flash light emitting part 20 is next described with reference to FIGS. 6 and 7. FIG. 6 is an exploded perspective view of the flash light emitting part 20. FIG. 7 is a vertical sectional view of the flash light emitting part 20.

Referring to FIGS. 6 and 7, the flash light emitting part 20 includes a case 40, a (flash) discharge tube 41, and a reflector 42. A holder 43 is arranged to hold the discharge tube 41 and the reflector 42 within the case 40. The reflector 42 is mounted on the holder 43 from the front thereof. The discharge tube 41 is inserted sideways after mounting the reflector 42. Then, two ends 44a of a rubber piece 44 are applied from the outer side of the holder 43 to cover the right and left terminal parts of the discharge tube 41. A connecting part 44b of the rubber piece 44 exerts a tensile force to push the discharge tube 41 and the reflector 42 against the holder 43 in a state of being in contact with each other. The holder 43 has three reflector-abutting surfaces including a flat surface 43a and slanting surfaces 43b located above and below the flat surface 43a. Under the tensile force of the rubber piece 44, the discharge tube 41 and the reflector 42 are stably abutting on the three abutting surfaces of the holder 43, and are thus stably positioned both in the horizontal and vertical directions.

Lead wires 45 and 46 are soldered to the right and left terminal parts of the discharge tube 41. A lead wire 47 for triggering is attached to the terminal part of the reflector 42. The holder 43 is inserted into the case 40 from an opening 40c formed in the lower side of the case 40 in a state of having the above-stated parts and the lead wires mounted thereon.

An optical prism 50 is arranged to converge the light of the discharge tube 41 by the internal reflection and refraction thereof toward an object of shooting for illuminating the object. The optical prism 50 has a front exit surface 50a formed into a cylindrical lens arranged in a direction perpendicular to the axial direction of the discharge tube 41. The rear part of the optical prism 50 is composed of entrance surfaces 80 and 81 for allowing a light flux emitted from the discharge tube 41 to enter the optical prism 50 and reflection surfaces 82 for reflecting forward the incident light flux. The shape of the optical prism 50 is arranged to be vertically symmetric with respect to the axis of the discharge tube 41.

A reflection plate 51 is arranged to reflect for once the light which comes from the whole exit surface 50a of the optical prism 50 at a certain angle with respect to a direction in which the object is located and, after that, to cause the light to exit through the opening 40a of the case 40. The optical prism 50 and the reflection plate 51 are inserted into the case 40 from the opening 40a in a state of having the shafts 50c and 50d of the optical prism 50 respectively engaging a hole 51a and a cutout 51b of the reflection plate 51. The optical prism 50 and the reflection plate 51 are then positioned with the shaft 50c of the optical prism 50 set to engage a hole 40b provided in the lower side of the case 40.

Protruding parts 50e are provided on the right and left sides of the optical prism 50. When the optical prism 50 is inserted into the case 40 from the opening 40a, the protruding parts 50e come into cutout parts 43c provided in the holder 43 which is inserted there prior to the optical prism 50. By virtue of this arrangement, positional deviations of the optical prism 50 from the discharge tube 41 and the reflector 42 inserted in the holder 43 in the direction perpendicular to the optical axis can be minimized.

A cover member 48 is provided for covering the opening 40c provided in the lower side of the case 40. The cover member 48 is screwed to the case 40 with screws 49 together with the holder 43.

A zoom panel 52 and a flash-device window 54 are provided for varying the illuminating angle of the flash device by varying a distance between them. The zoom panel 52 has a plurality of convex cylindrical lenses 52a which extend in the direction parallel with the axis of the discharge tube 41. The zoom panel 52 has also a sleeve 52b formed in a part thereof arranged to enable the zoom panel 52 to be moved back and forth.

The zoom panel 52 is inserted into the case 40 from one side of the case 40 in front of the optical prism 50 through a hole 40d provided in the case 40. A guide bar 53 is inserted through a hole 52c of the sleeve 52b. The zoom panel 52 is thus supported by the case 40 to be movable back and forth along the guide bar 53.

Further, a spring 56 is hooked on a spring peg 52d of the zoom panel 52 and a spring peg 58 (see FIG. 14) of the case 40. The zoom panel 52 is thus arranged to be always urged toward the optical prism 50. The flash-device window 54 has its rear surface formed into concave cylindrical lenses 54a which are in the same number as the convex cylindrical lenses 52a of the zoom panel 52 and in a shape reverse to the shape of the convex cylindrical lenses 52a. The front surface of the flash-device window 54 is shaped in a flat plane. The flash-device window 54 is provided with claws 54b and 54c on its left and right sides. The claw 54b is inserted into a cutout part 40e of the case 40, and, then, the claw 54c is inserted in an elastically deformed state until the claw 54c comes to engage a hook part 59 (see FIG. 4) provided on the case 40.

With the flash-device window 54 inserted in this manner, the hole 40d of the case 40 is covered and, at the same time, the guide bar 53 is prevented by the flash-device window 54 from coming off its position.

A rib 54d which is provided at a part of the alignment of the concave cylindrical lenses 54a engages a guide groove 52f formed by cutting out a part of the alignment of the convex cylindrical lenses 52a when these parts are assembled. By this engagement, the zoom panel 52 is prevented from turning around the guide bar 53.

The zoom panel 52 is arranged to bring about a wide-angle state for a wide flash-light illuminating angle when it is at a rear position located far away from the flash-device window 54 and a telephoto state for a narrow flash-light illuminating angle when it is at a front position located close to the flash-device window 54.

Figure 15A:
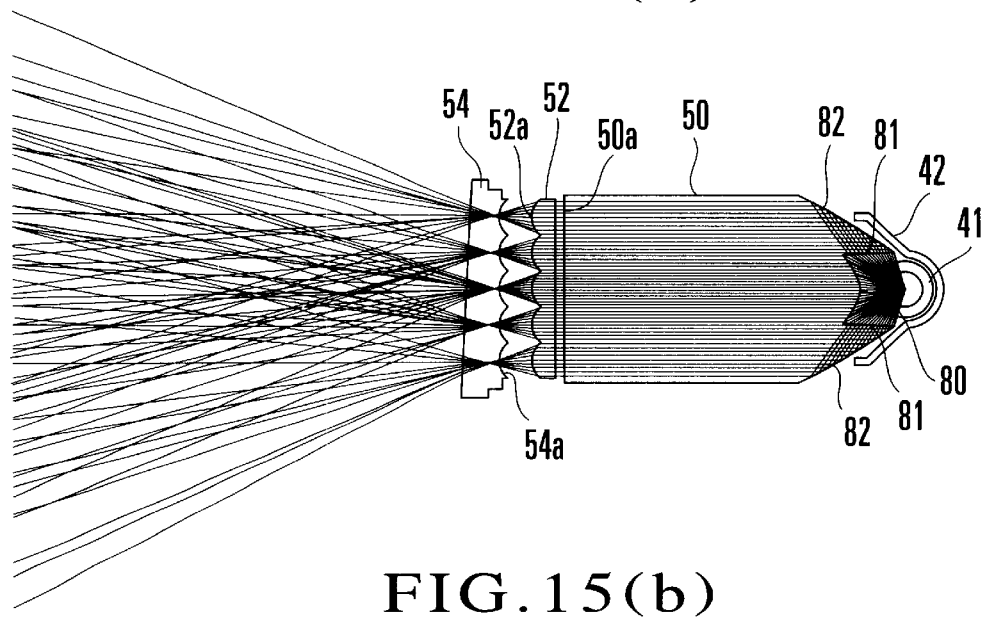
FIGS. 15(a), 15(b) and 15(c) are diagrams showing the variation of the illuminating angle.
Figure 15B:
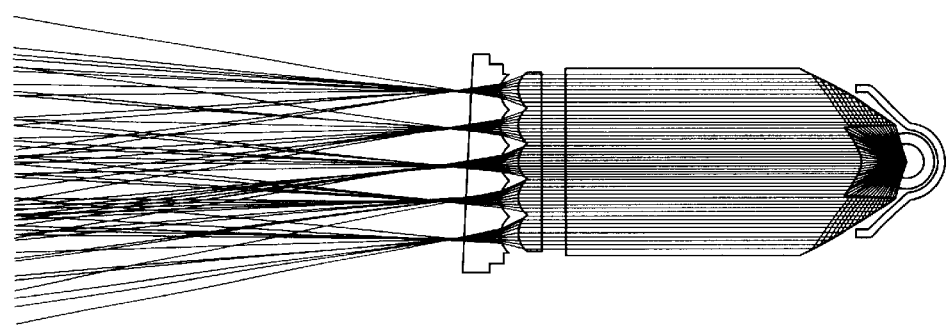
Figure 15C:
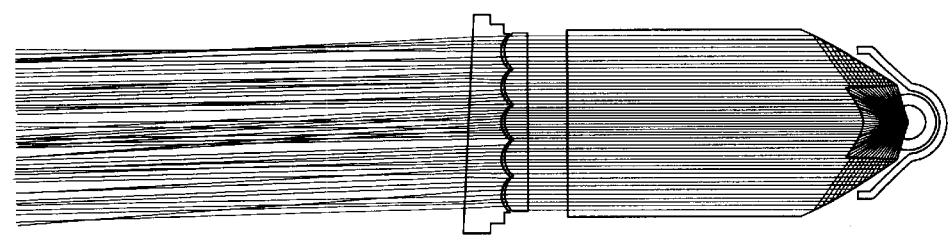

The flash-light illuminating angle is caused to vary when the zoom panel 52 moves back and forth in a manner as described below. FIGS. 15(a), 15(b) and 15(c) show the states of light fluxes emitted from the discharge tube 41, including a wide-angle state, a middle focal length state and a telephoto state.

Referring to FIGS. 15(a), 15(b) and 15(c), the light fluxes emitted from the discharge tube 41 enter the entrance surfaces 80 and 81 of the optical prism 50. The entrance surface 80 has a curved surface arranged to give an approximately parallel light flux when a light flux emitted forward from the center of the discharge tube 41 falls thereon.

The entrance surfaces 81 are arranged to cause light fluxes emitted obliquely upward and downward from the center of the discharge tube 41 to be first refracted outward and to be directed to reflection surfaces 82. The reflection surfaces 82 are curved surfaces arranged to totally reflect the light fluxes from the entrance surfaces 81 and to cause them to be directed toward an object of shooting through the inside of the optical prism 50 as parallel light fluxes.

The reflector 42 is formed in a cylindrical shape having its center coincident with the axis of the discharge tube 41. Therefore, light fluxes emitted rearward from the discharge tube 41 are reflected by the reflector 42 and, after that, again pass through the inside of the discharge tube 41 to be incident on the entrance surfaces 80 and 81. The light fluxes reflected by the reflector 42 are thus arranged to eventually take about the same path as the light fluxes directly incident on the entrance surfaces 80 and 81.

Light fluxes emitted from points deviating from the center of the discharge tube 41 take about the same path as the light flux emitted from the center of the discharge tube 41. However, since they differ in angle of refraction and reflection according to the amount of their deviation from the center, these light fluxes are directed to the object at a somewhat spreading angle. The entrance surfaces 80 and 81 and the reflection surfaces 82 are formed in such shapes that direct the light fluxes toward the object at a very small angle with respect to the optical axis in view of the whole discharge tube 41. Further, for making illustrations easily understandable, FIGS. 15(a), 15(b) and 15(c) show only the light fluxes that are incident directly on the entrance surfaces 80 and 81.

After proceeding through the inside of the optical prism 50, the incident light fluxes exit from the exit surface 50a. The exit surface 50a is formed as a cylindrical lens having its axis in a direction perpendicular to the axis of the discharge tube 41. Therefore, when exiting from the exit surface 50a, the horizontal components of the light fluxes are refracted according to the lens curvature of the cylindrical lens, and the vertical components of the light fluxes are refracted according to the angles of exiting. The R shape of the cylindrical lens of the exit surface 50a is arranged to converge light in the horizontal direction to a certain degree that covers the angle of view obtained in the wide-angle state.

The optical prism 50 thus converges the light fluxes emitted from the discharge tube 41 to a very narrow degree of angle in the vertical direction and to a certain degree that covers the angle of view in the wide-angle state in the horizontal direction.

The light fluxes having exited from the optical prism 50 come to pass through the zoom panel 52 and the flash-device window 54. Since the front side of the zoom panel 52 is composed of the convex cylindrical lens surface 52a while the rear side of the flash-device window 54 is composed of the concave cylindrical lens surface 54a, the light fluxes passing through the zoom panel 52 are refracted and converged by the convex cylindrical lens surface 52a and, after that, are refracted into the original state by the concave cylindrical lens surface 54a of the flash-device window 54.

In the wide-angle state shown in FIG. 15(a), the position of the zoom panel 52 is set to have the focus position of the convex cylindrical lenses 52a in the neighborhood of the vertex of the concave cylindrical lenses 54a. The light fluxes, which have exited from the optical prism 50 in a converged state, pass through the inside of the flash-device window 54 in a diverged state to be directed toward the object of shooting at a wide illuminating angle.

In the middle focal length state shown in FIG. 15(b), the position of the zoom panel 52 is shifted forward from the position of the wide-angle state. A distance between the zoom panel 52 and the flash-device window 54 becomes smaller. The focus position of the convex cylindrical lens surface 52a is shifted to the inside of the flash-device window 54.

Under this condition, the light fluxes, which have been converged by the convex cylindrical lens surface 52a, are refracted by the concave cylindrical lens surface 54a back to the original state. Therefore, a composite focal length becomes longer. As a result, an illuminating light flux is directed to the object at a narrower illuminating angle. The composite focal length becomes shorter accordingly as the distance between the convex cylindrical lens surface 52a and the concave cylindrical lens surface 54a is smaller, and longer accordingly as the distance is larger. Therefore, the illuminating angle is continuously variable by adjusting this distance.

In the telephoto state shown in FIG. 15(c), the zoom panel 52 and the flash-device window 54 are almost in contact with each other. Under that condition, the light fluxes exiting from the convex cylindrical lens surface 52a come to be incident on approximately symmetric positions of the concave cylindrical lens surface 54a. The incident light fluxes are, therefore, refracted backward at about the same angle as the refraction angle of the convex cylindrical lens surface 52a. As a result, there is obtained a state which is approximately the same as having no convex and concave cylindrical lenses 52a and 54a. Thus, the object is illuminated at a very narrow light distributing angle under the control of the optical prism 50.

According to the arrangement of the present embodiment, the degree of divergence is controlled only in the vertical direction by means of the convex and concave cylindrical lenses 52a and 54a. In respect to the horizontal direction, the illuminating angle of the wide-angle state is maintained by converging the light fluxes at the exit plane 50a of the optical prism 50. However, the degree of divergence in the horizontal direction may be controlled in the same manner as in the vertical direction by likewise arranging convex and concave cylindrical lenses also for the horizontal direction.

In controlling the illuminating angle by varying the focal length with the convex and concave lenses as mentioned above, if each of the lenses comes to deviate in a direction perpendicular to the optical axis thereof, i.e., decenters, the degree of divergence cannot be controlled as desired by controlling the distance between the concave lenses 54a and the convex lenses 52a. Such deviation brings about also such a problem that the object illuminating direction deviates from a correct illuminating direction. Further, if parts forming the lens happen to slant, the slant also makes it difficult to control the degree of divergence as desired even in the state of varying the distance by adjusting the lens position.

To solve these problems, the present embodiment is arranged to minimize the amount of slant of parts by guiding the movement of the zoom panel 52 with the guide bar 53 and by driving them with the zoom driving lever 22, and to suppress the decentering by eliminating rattling in the rotating direction around the guide bar 53 with the rib 54*b* arranged at the flash-device window 54 to engage the guide groove 52*f* of the zoom panel 52. The present embodiment is thus arranged to be capable of accurately controlling the divergence of flash light.

The arrangement of the flash light emitting part 20 is further described. Referring to FIG. 6, a trigger coil 55 is provided for applying a light emitting trigger voltage. The lead wire 47 connected to the reflector 42 is connected to a terminal 55*a* of the trigger coil 55. To terminals 55*b* of the trigger coil 55 are connected lead wires which are connected to a light emission control circuit board (not shown). The trigger coil 55 is disposed in an opening part 40*h* formed in front of the protruding part 26 formed integrally with the case 40. When the flash light emitting part 20 moves, the trigger coil 55 also moves along with the flash light emitting part 20. With the trigger coil 55 arranged in this manner, the lead wire 47 which connects the trigger coil 55 to the reflector 42 can be allowed to be very short in total length. The short length of the lead wire 47 minimizes a voltage drop in applying a trigger voltage, so that a malfunction such as inadequate light emission can be prevented from taking place.

Further, since a part which houses the trigger coil 55 is disposed at the protruding part 26 provided for guiding the movement of the flash light emitting part 20 in protruding and stowing it, the whole flash light emitting part 20 can be compactly arranged. It is another advantage that the arrangement for forming the housing part at the protruding part 26 serves to increase thickness, so that a sufficient strength can be obtained against such external forces that might be exerted when the flash light emitting part 20 is protruded.

With the camera arranged as described above, the protruding and stowing actions on the flash light emitting part 20 are next described.

When a power supply switch 60 disposed on an upper part of the camera as shown in FIG. 2 is operated when the power supply of the camera is in an off-state as shown in FIG. 1, the camera control circuit starts to energize and cause the motor 3 to rotate in the direction of drawing out the photo-taking lens barrel 2. The rotation of the motor 3 causes the worm wheel 4 and the reduction gear train (5 to 9) to rotate and thus to rotate the driving ring 10. The rotation of the driving ring 10 causes the photo-taking lens groups to move in the direction of protruding, i.e., toward a wide-angle position. At the same time, the gears 11, 12 and 13, which are arranged to drive the flash device, rotate to cause the driving cam 15 to rotate through the shaft 14.

Figure 8:
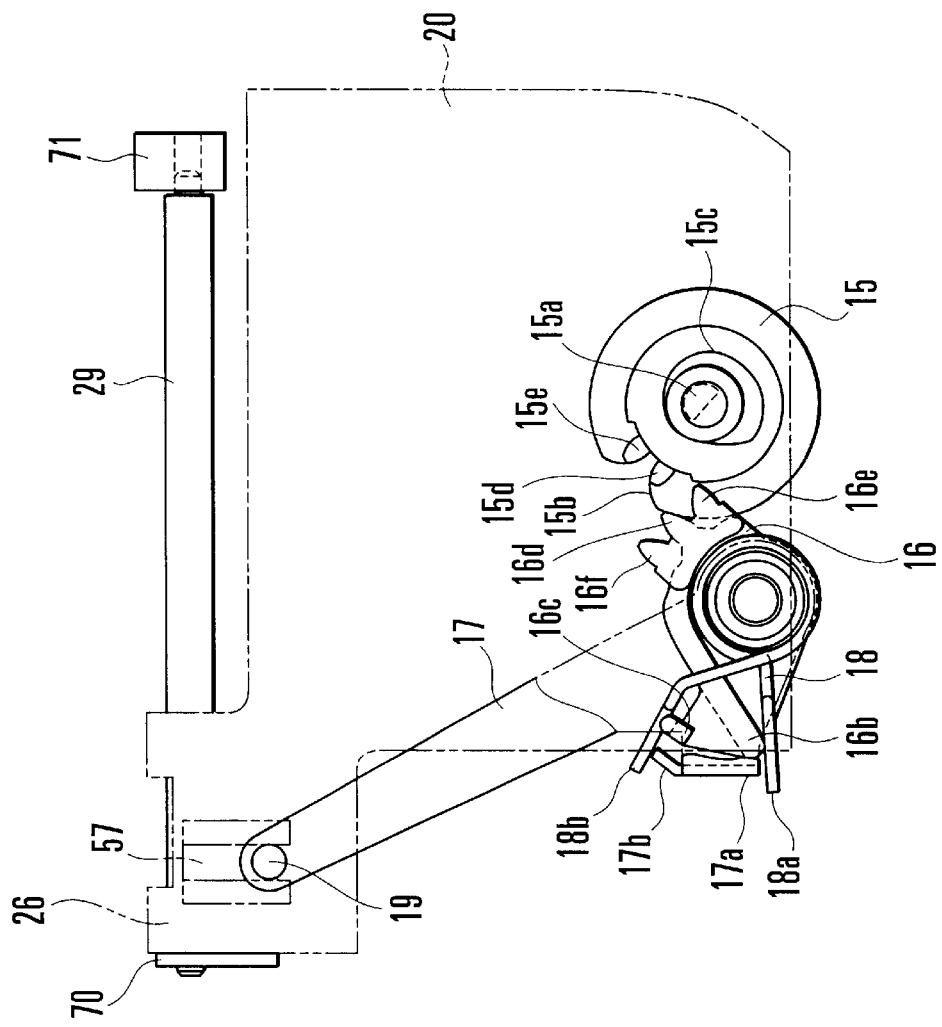
FIG. 8 is a diagram showing the arrangement of a driving mechanism in a state in which the flash light emitting part is located at the stowed position.
Figure 9:
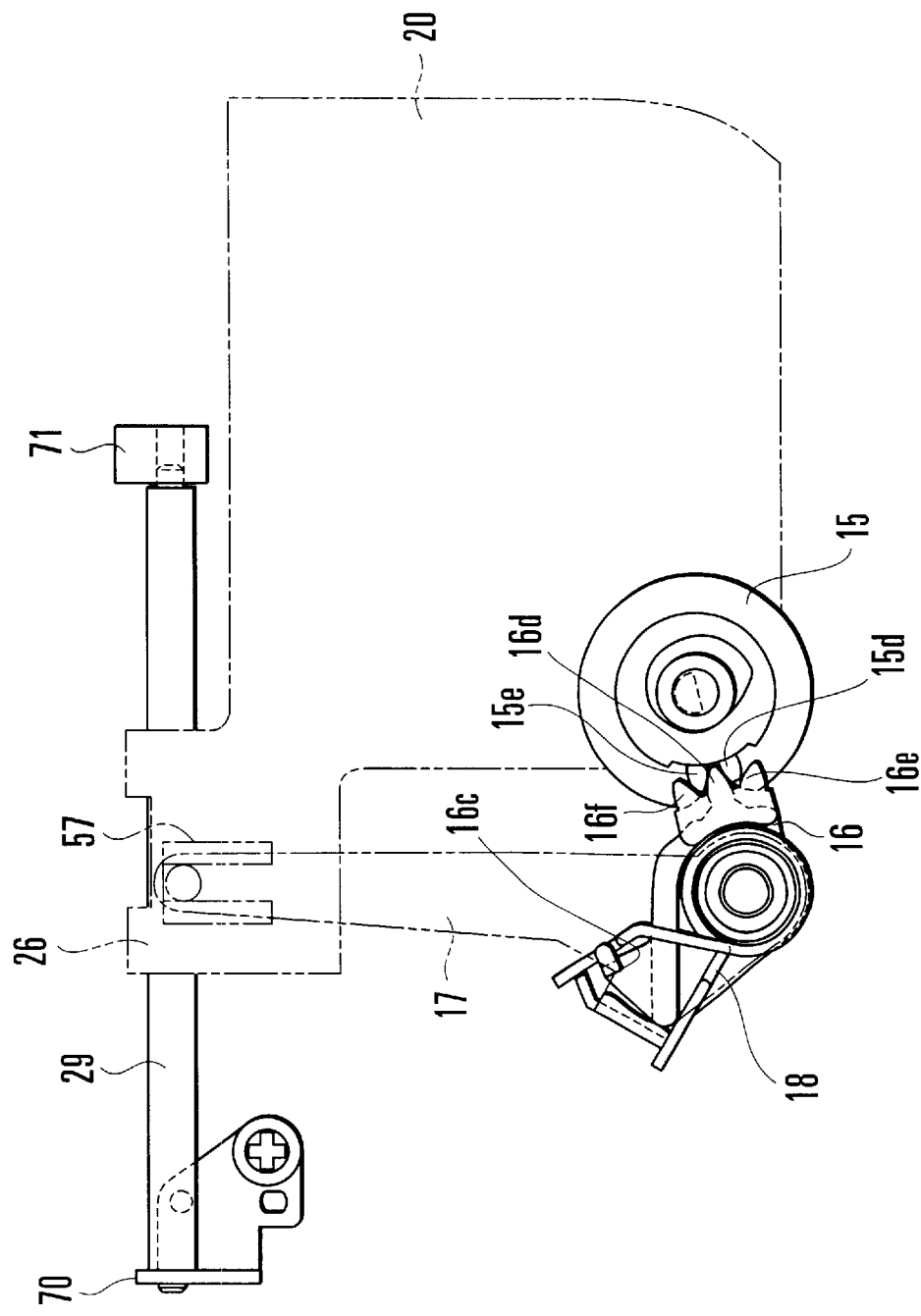
FIG. 9 is a diagram showing the arrangement of the driving mechanism in a state in which the flash light emitting part is in process of being protruded.
Figure 10:
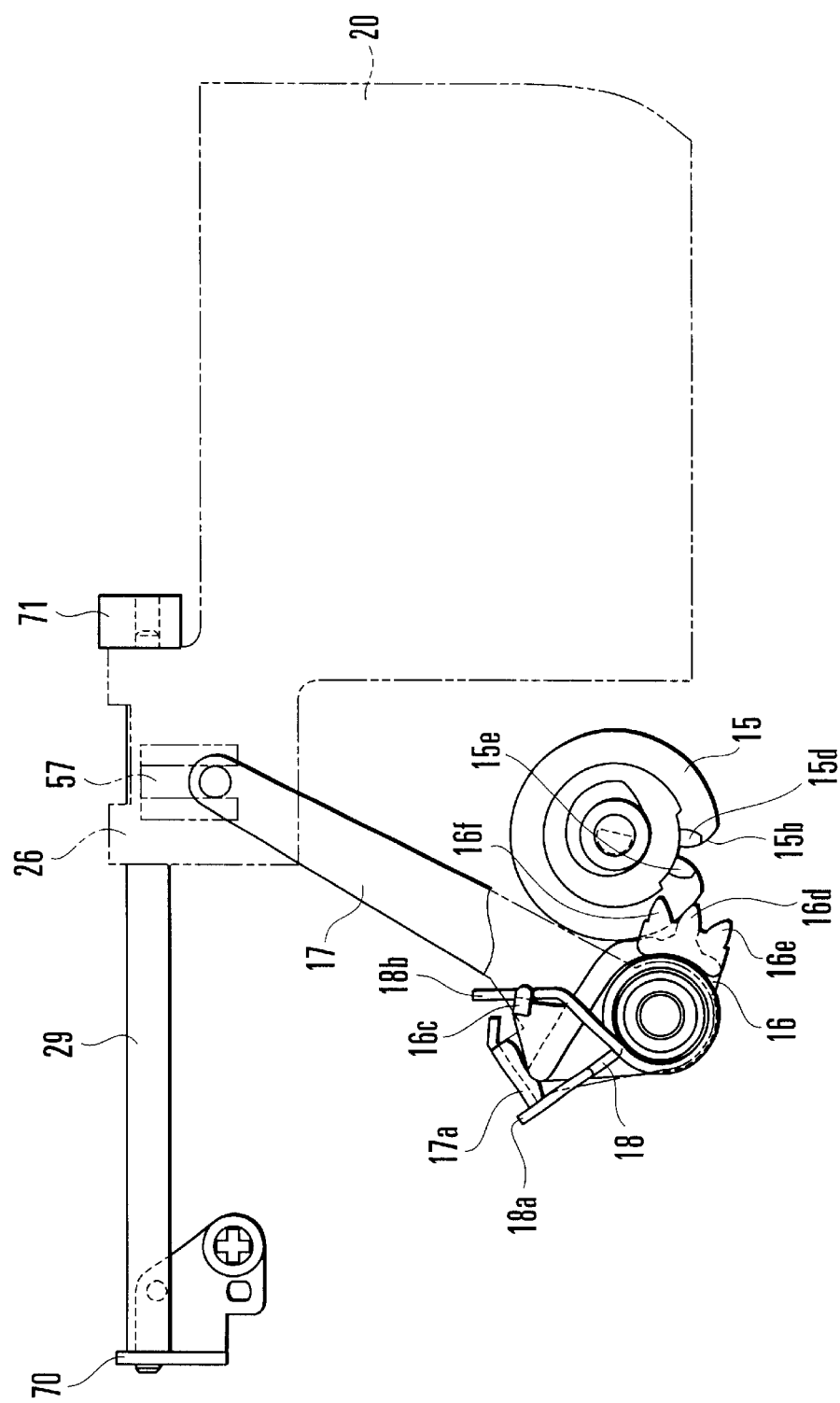
FIG. 10 is a diagram showing the arrangement of the driving mechanism in a state in which the flash light emitting part is located at the protruded position.

The movement of the driving cam 15 and that of the driving lever 16 are described with reference to FIGS. 8, 9 and 10. FIG. 8 shows a state obtained with the power supply of the camera in its off-state. In this state, the photo-taking lens barrel 2 is in a drawn-in position and the flash light emitting part 20 is in a stowed position.

In this state, the protruding part 26 of the flash light emitting part 20 is abutting on the holder 70. The flash-device driving lever 17 is thus prevented from swinging counterclockwise as shown in FIG. 8. The gear tooth 16*d* of the driving lever 16 is abutting on the arcuate surface of the slide cam 15*b* of the driving cam 15. Since the protruding part 16*b* of the driving lever 16 is arranged to charge one arm part 18*a* of the spring 18 in the counterclockwise direction, the other arm part 18*b* of the spring 18 is elastically pushing the bent part 17*b* of the driving lever 17. Therefore, the flash light emitting part 20 is stably pushed to the stowed position.

When the motor 3 begins to rotate with the power supply switch 60 operated in this state, the driving cam 15 begins to rotate counterclockwise as viewed in FIG. 8. When the driving cam 15 begins to rotate, the gear tooth 16*d* of the driving lever 16 comes to slide over the slanting surface of the slide cam 15*b*. The driving lever 16 then begins to rotate clockwise. At the same time, the flash-device driving lever 17 also begins to swing. Then, the engagement of the shaft 19 and the U-shaped part 57 causes the flash light emitting part 20 to move away from the holder 70 (toward the protruded position) along the guide bar 29.

With the driving lever 16 rotating further along the slide cam 15*b*, the gear tooth 15*d* and the gear tooth 16*e* begin to mesh with each other, so that a normal gear driving begins in this state.

The cam surface of the slide cam 15*b* is in a shape of extending the involute curve of the meshing surface of the gear tooth 15*d*. Therefore, a cam driving state obtained by the contact of the gear tooth 16*d* with the slide cam 15*b* quite smoothly shifts to a gear driving state obtained by contact with the gear tooth 15*d*.

When the driving cam 15 rotates further, the gear tooth 15*e* begins to engage the gear tooth 16*d*. When the gear tooth 15*e* and the gear tooth 16*d* come to disengage from each other, the lift part of the slide cam 15*b* which is in a shape of extending the involute curve of the gear tooth 15*e* comes into contact with the gear tooth 16*d* to bring about a cam driving state. In this instance, since the cam surface of the lift part of the slide cam 15*b* is in the shape obtained by extending the meshing surface of the gear tooth 15*e*, the gear driving state also smoothly shifts to the cam driving state.

When the flash light emitting part 20 comes to abut on the holder 71 on the protruding side while the driving lever 16 is in process of being caused to rotate clockwise by the lift part of the slide cam 15*b*, the flash light emitting part 20 ceases to move.

The driving cam 15 rotates further to have the arm part 18*b* of the spring 18 to be charged by the protruding part 16*c* of the driving lever 16. After that, the gear tooth 16*d* comes from the lift part of the slide cam 15*b* to reach the arcuate part of the slide cam 15*b* and the driving lever 16 ceases to swing. After that, when the wide-angle position of the photo-taking lens is detected by a position detecting means of the photo-taking lens barrel 2, the supply of power to the motor 3 is brought to a stop, and the camera becomes ready for photo-taking.

In the state thus obtained, the flash light emitting part 20 is stably pushed against the holder 71 by the spring force of the spring 18. The flash light emitting part 20 is moved in the above-stated manner to the protruded position in association with the movement of the photo-taking lens barrel 2 from the drawn-in position to the wide-angle position.

In a case where some external force is applied to the flash light emitting part 20 to push it toward the stowed position while it is at the protruded position, the flash-device driving lever 17 swings following the movement of the flash light emitting part 20. However, the driving lever 16 is prevented from rotating as the gear tooth 16*d* is abutting on the arcuate part of the slide cam 15*b* of the driving cam 15. Therefore, the arm part 18a of the spring 18 alone comes to be charged by the bent part 17a of the flash-device driving lever 17 while the other arm part 18b of the spring 18 remains stationary.

When the external force is removed, the charged spring force of the spring 18 causes the flash light emitting part 20 to move back to the protruded position. Even in a case where the movement of the flash light emitting part 20 is blocked by an external force while it is in process of the movement, the flash-device driving lever 17 is also prevented from swinging together with the movement of the flash light emitting part 20, so that the arm part 18b is alone gradually charged by the flash-device driving lever 17. Then, upon removal of the external force, the flash light emitting part 20 is brought back to the protruded position by the charged spring force of the spring 18.

The action of moving the flash light emitting part 20 from the protruded position to the stowed position is performed in a manner exactly reverse to the manner in which it is moved from the stowed position to the protruded position. The motor 3 is energized and driven to reversely rotate. The reverse rotation of the motor 3 drives the photo-taking lens barrel 2 to move in the direction of being drawn inward. Then, the driving cam 15 is driven to rotate clockwise. The clockwise rotation of the driving cam 15 brings about a cam driven state, a gear driven state and, again, a cam driven state of the driving lever 16. As a result, the flash light emitting part 20 is moved until it comes to abut on the holder 70 on the stowed side.

Further, if an external force is applied to the flash light emitting part 20 while it is in process of movement from the protruded position to the stowed position, it is only the spring 18 that is charged and, the flash light emitting part 20 can be brought back to the predetermined position by the spring force upon removable of the external force, as in the above-stated case.

As described above, in the present embodiment, the center of rotation of the driving cam 15 and the centers of swing of the driving levers 16 and 17 are allocated at the middle point of the parallel slide range of the flash light emitting part 20. In moving the flash light emitting part 20 from the stowed position to the protruded position and vice versa, the driving levers 16 and 17 which are slanting to one end of the parallel slide range are first swung approximately to the middle point of the parallel slide range without fail by the meshing of the gear teeth 15d and 15e with the gear teeth 16d, 16e and 16f. After that, the driving levers 16 and 17 are swung to slant to the other end of the parallel slide range by means of the slide cam 15b. The driving levers 16 and 17 are then kept in the swung states. According to the arrangement of the present embodiment, the above-stated actions can be reliably carried out in sequence by the simple and compact arrangement without having recourse to a clutch mechanism, etc.

Further, the present embodiment has the slide cam 15b arranged to continue from the gear teeth 15d and 15e of the driving cam 15. By virtue of this arrangement, the swinging ranges of the driving levers 16 and 17, i.e., the parallel slide range of the flash light emitting part 20, can be freely set as desired by just varying the shape of the slide cam 15b, such as the height thereof, etc.

Further, the meshing surfaces of the gear teeth 15d and 15e and the cam surface of the slide cam 15b are formed in a continuous involute curved shape. By virtue of this arrangement, the movement between these gears and the cam can be smoothly made, so that the driving cam 15 can be driven without any unnecessary load on the driving action.

The relation of the driving cam 15 to parts related to a zooming action on the photo-taking lens barrel 2 is next described.

The zooming action to move the photo-taking lens barrel 2 from a wide-angle end position to a telephoto position is caused to begin by operating a telephoto-direction zooming button 61 shown in FIG. 2. When the telephoto-direction zooming button 61 is operated, the motor 3 is energized. The motor 3 begins to rotate in a telephoto direction. The rotation of the motor 3 causes the driving cam 15 to begin to rotate counterclockwise from the wide-angle position. The zoom cam 15c of the driving cam 15 then causes the follower lever 21 and further the zoom driving lever 22 to be driven. By this driving, the zoom panel 52 of the flash light emitting part 20 is driven to vary the illuminating angle.

At this time, the gear tooth 16d of the driving lever 16 is abutting on the arcuate part of the driving cam 15 under the spring force of the spring 18. The driving cam 15, therefore, rotates under a certain amount of frictional force. However, since the arcuate surface of the driving cam 15 is in contact with the involute curved surface of the gear tooth 16d, the driving cam 15 can smoothly rotate in contact with the gear tooth 16d under a low load without necessitating use of any follower.

Further, since no driving force is transmitted to the driving lever 16 which is abutting on the arcuate part of the slide cam 15b, the driving cam 15 is isolated from the zooming action. Therefore, the zooming action can be carried out with the flash light emitting part 20 being stably kept at the protruded position.

After the zooming action is performed to the middle focal length position or to the telephoto position, when a wide-angle-direction zooming button 62 is operated for zooming toward the wide-angle position, the driving cam 15 comes to rotate clockwise. As in the case of driving in the telephoto direction, the driving cam 15 only has the arcuate part of the slide cam 15b in contact with the involute curved surface of the gear tooth 16d of the driving lever 16 also in this instance. Therefore, the driving action can be carried out under a low load and without any undesired bite.

The driving mechanism for protruding and stowing the flash light emitting part 20 in the present embodiment is arranged, as described above, to have no driving force transmitted while it is performing the illuminating angle driving action. The illuminating angle varying process thus can be carried out without any large load generated. The arrangement, therefore, obviates the necessity of a mechanism for keeping the flash light emitting part 20 at the protruded position. In addition, the arrangement gives no unnecessary load to the zooming action on the photo-taking lens barrel 2.

Besides, the driving mechanism for protruding and stowing the flash light emitting part 20 and the mechanism for varying the illuminating angle are not directly using the motion of the photo-taking lens barrel 2 as a drive source. Therefore, the driving actions can be carried out to move the flash light emitting part 20 to the protruded or stowed position and to vary the illuminating angle without giving any load that might bring about an adverse effect on the lens performance of the camera.

Figure 11:
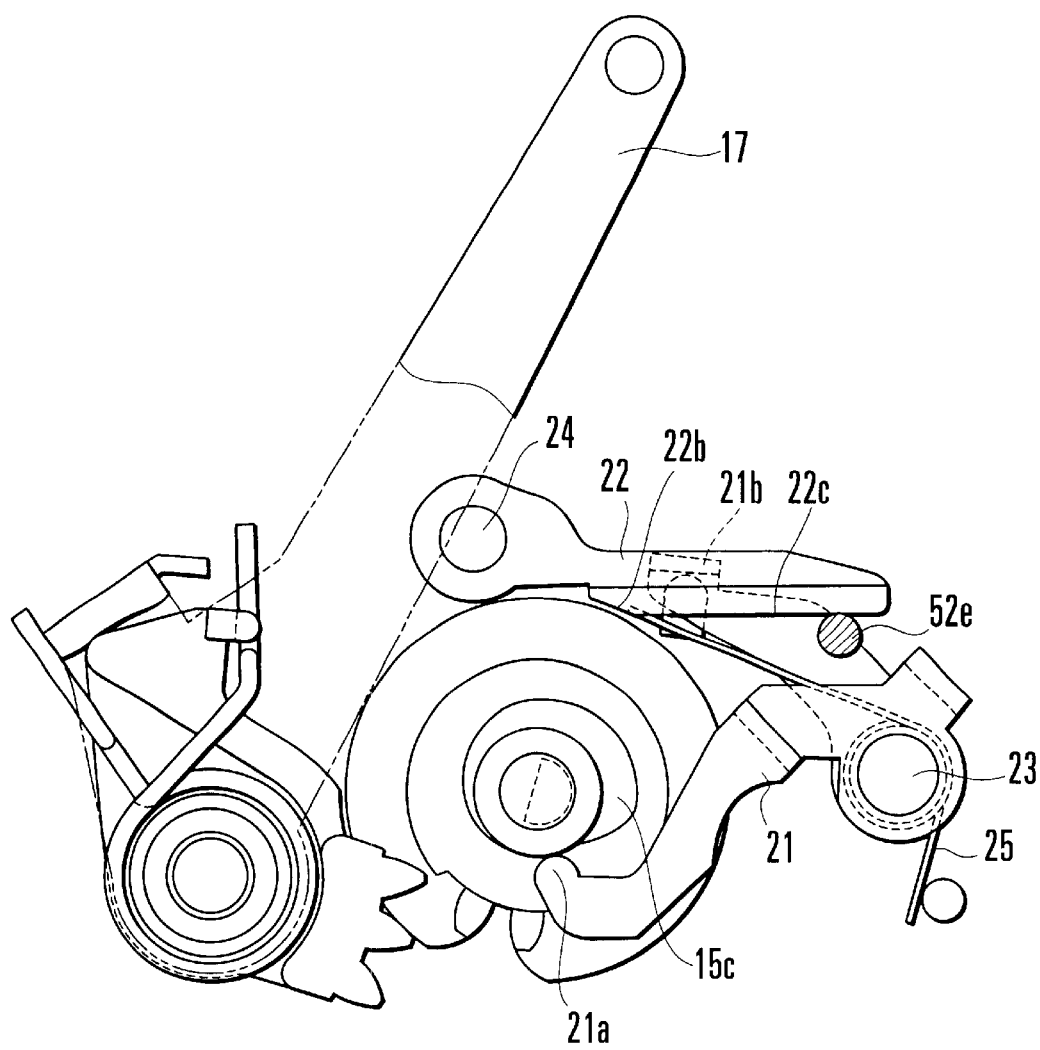
FIG. 11 is a diagram showing an illuminating-angle varying mechanism for varying the illuminating angle of the flash light emitting part in a state in which the photo-taking lens barrel is at a wide-angle position.
Figure 12:
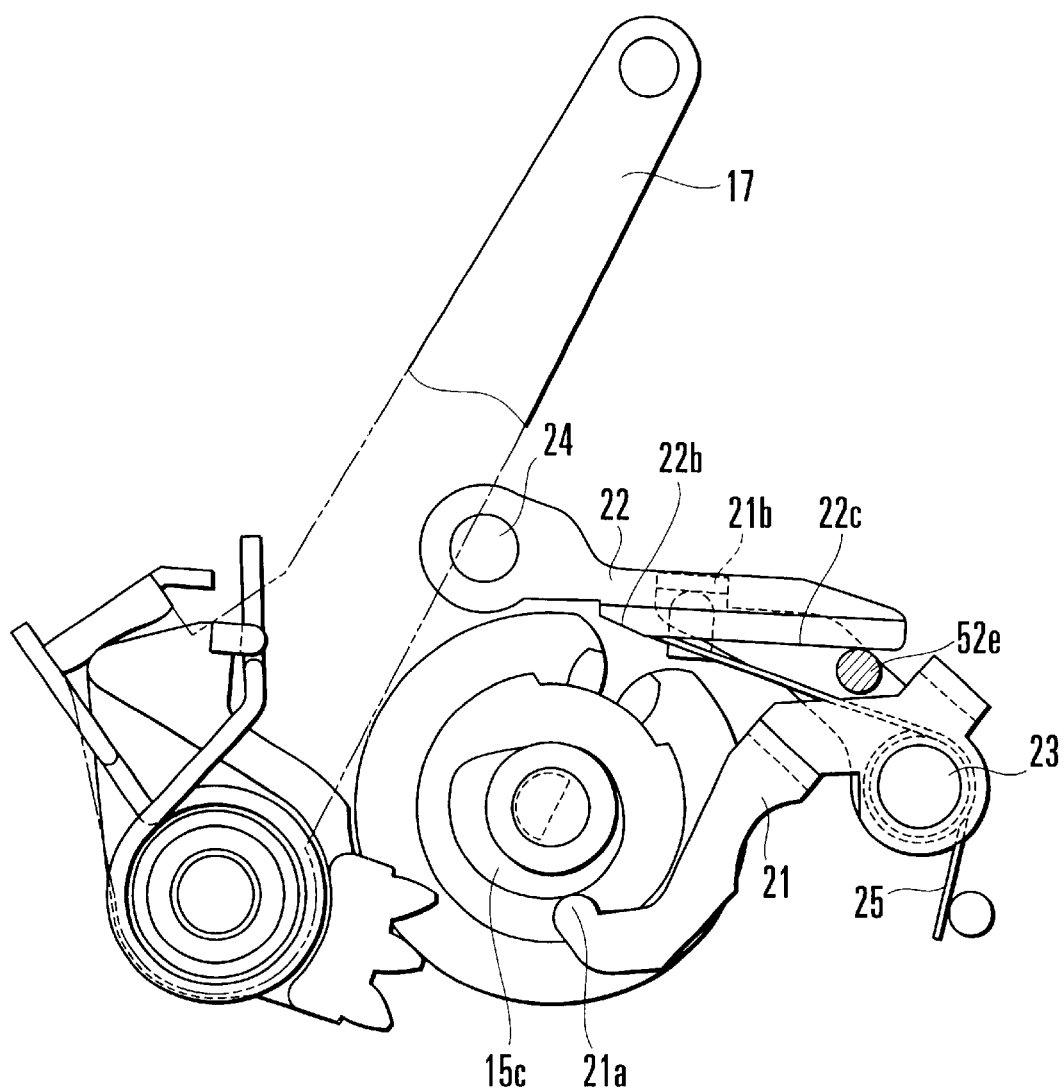
FIG. 12 is a diagram showing the illuminating-angle varying mechanism in a state in which the photo-taking lens barrel is at a middle focal-length position.
Figure 13:
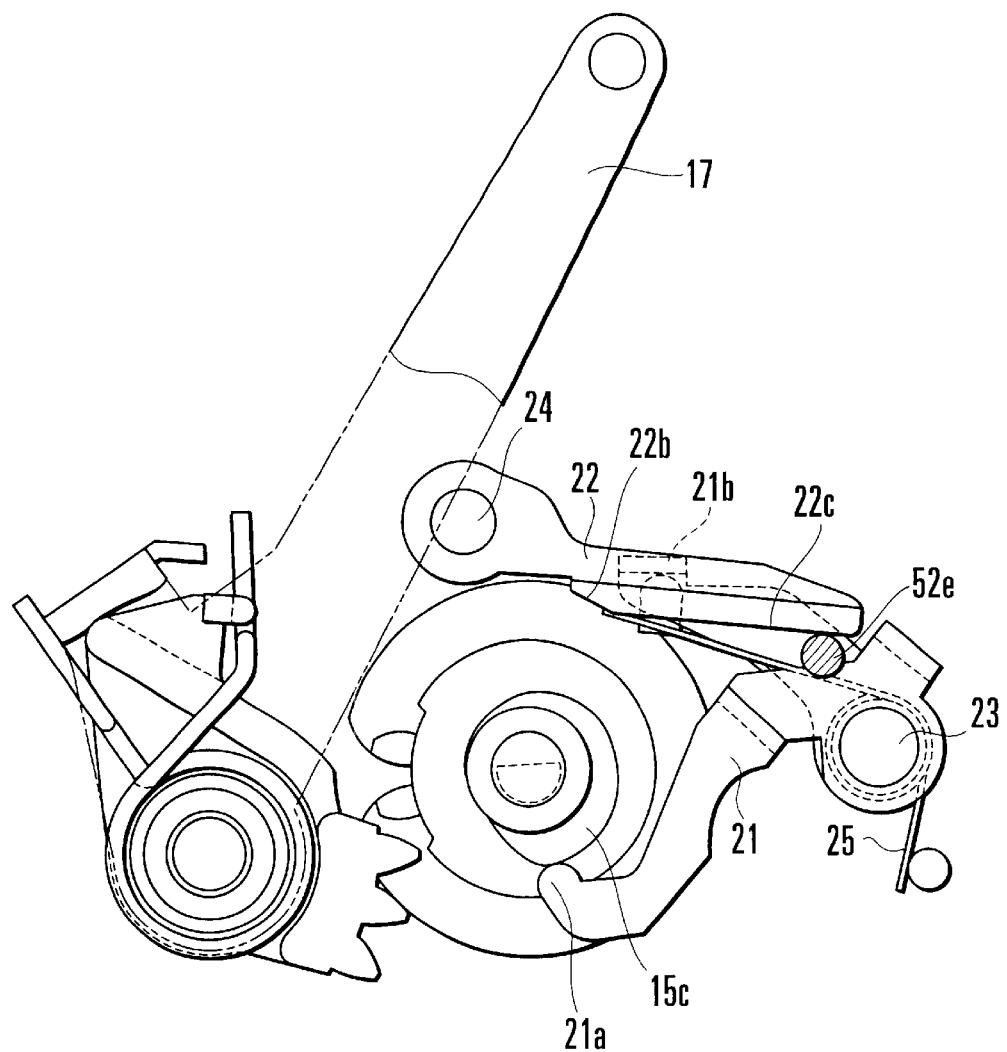
FIG. 13 is a diagram showing the illuminating-angle varying mechanism in a state in which the photo-taking lens barrel is at a telephoto position.
Figure 14:
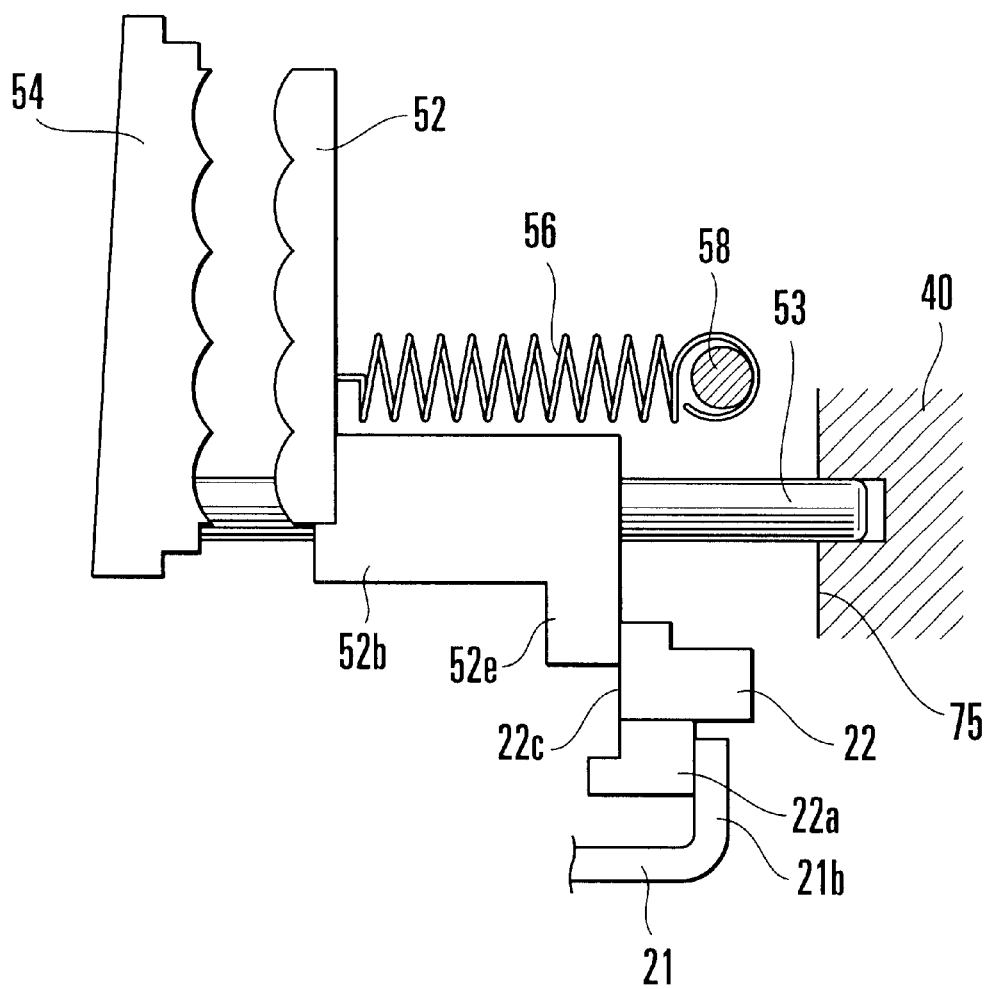
FIG. 14 is a side view showing parts related to an illuminating-angle-varying driving action and disposed within the flash light emitting part.

The action of varying the illuminating angle of the flash device is next described with reference to FIGS. 11 to 14. FIG. 11 shows the illuminating angle varying mechanism in a state obtained when the photo-taking lens barrel 2 is at the wide-angle position. FIG. 12 shows the illuminating angle varying mechanism in a state obtained when the photo-taking lens barrel 2 is at the middle focal length position. FIG. 13 shows the illuminating angle varying mechanism in a state obtained when the photo-taking lens barrel 2 is at the telephoto position. FIG. 14 shows parts related to the illuminating angle varying action arranged within the flash light emitting part 20.

Referring to FIGS. 11 to 14, a shaft 52e is disposed at the rear end on the lower side of the sleeve 52b of the zoom panel 52. The shaft 52e comes into contact with the zoom driving lever 22 when the action of protruding the flash light emitting part 20 is performed. Then, when the driving lever 22 swings following a zooming action on the photo-taking lens barrel 2 as will be described later, the shaft 52e is pushed by the swing to cause the zoom panel 52 to move back and forth.

The zoom driving lever 22 is thus arranged to part from the shaft 52e of the zoom panel 52 when the flash light emitting part 20 is located at a position closer to the stowed position than to the protruded position. Compared with a case in which the two members 22 and 52e are kept in contact with each other, the zoom driving lever 22 can be arranged in a smaller size according to the arrangement of the present embodiment.

Figure 16:
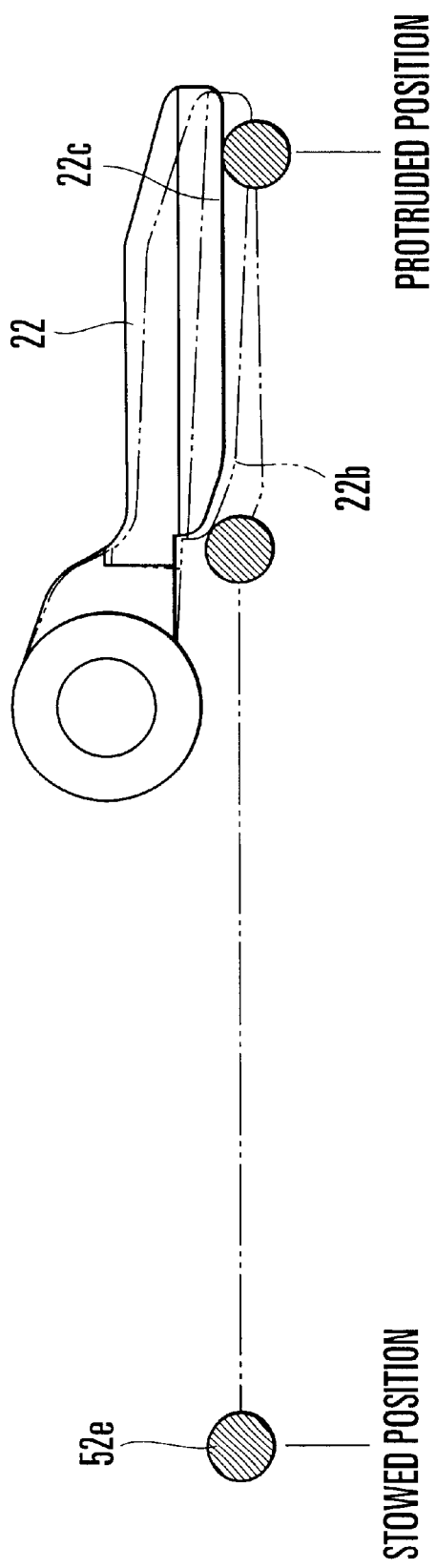
FIG. 16 is a diagram for explaining the engagement between a zoom driving lever and a zoom panel related to the illuminating-angle-varying driving action.

Further, FIG. 16 shows the manner in which the zoom driving lever 22 engages the shaft 52e of the zoom panel 52 while the flash light emitting part 20 is in process of being moved to the protruded position. The zoom panel 52 is urged to move to the rear of the case 40 by the spring 56, as shown in FIG. 14, and a stopper 75 of the case 40 is set further rearward than the lower surface 22c of the zoom driving lever 22. Therefore, the shaft 52e, which has abutted on a slanting surface 22b of the zoom driving lever 22 while the flash light emitting part 20 is in process of being protruded, is guided a little further forward by this slanting surface 22b. The shaft 52e thus comes to be guided by the lower surface 22c of the zoom driving lever 22. The illuminating angle position is thus controlled to be at a wide-angle illuminating angle position when the flash light emitting part 20 approximately arrives at the protruded position. Further, when the flash light emitting part 20 is at the stowed position, the follower lever 21 is in contact with the middle-focal-length area of the zoom cam 15c. The zoom driving lever 22 is then also at the middle-focal-length position and proceeds to swing toward the wide-angle position while the flash light emitting part 20 is in process of being protruded. Therefore, the zoom driving lever 22 engages the shaft 52e while it is swinging counterclockwise.

As mentioned above, the shaft 52e comes into contact with the zoom driving lever 22 to be guided to a normal position while the flash light emitting part 20 is in process of being protruded. Therefore, the zoom panel 52 is always drivable by the zoom driving lever 22 when the flash light emitting part 20 is at the protruded position, i.e., at a position where flash light can be emitted. The flash light illuminating angle thus always can be varied in association with the zooming action.

With the flash light emitting part 20 moved from the stowed position to the protruded position and with the shaft 52e of the zoom panel 52 coming to stably abut on the zoom driving lever 22, when the photo-taking lens barrel 2 is zoom-operated toward the telephoto direction after the wide-angle state shown in FIG. 11, the driving cam 15 rotates counterclockwise and the follower lever 21 then swings counterclockwise according to the lift of the zoom cam 15c. The counterclockwise swing of the follower lever 21 causes the bent part 21b to push the shaft 22a of the zoom driving lever 22, so that the zoom driving lever 22 is caused to swing clockwise to move the zoom panel 52 forward. As a result, the illuminating angle varying mechanism comes into the middle focal length state shown in FIG. 12. Then, when the photo-taking lens barrel 2 is further zoom-operated toward the telephoto position and the driving cam 15 rotates counterclockwise, the illuminating angle varying mechanism comes into the telephoto state shown in FIG. 13.

On the other hand, when the photo-taking lens barrel 2 is zoom-operated from the middle focal length position or the telephoto position toward the wide-angle position, the driving cam 15 rotates clockwise. The zoom driving lever 22 then swings counterclockwise according to the decrease of lift of the zoom cam 15c, and the zoom panel 52 moves rearward.

As described above, according to the present embodiment, the driving mechanism is composed of a driving member which rotates, on a shift extending in the vertical direction of the camera body, in association with the movement of the photo-taking lens barrel in the direction of the optical axis (for example, which operates by receiving a driving force transmitted from a lens driving mechanism for driving the photo-taking lens in the direction of the optical axis), and a driven member arranged to be driven by the driving member to swing on a vertically extending shaft in such a way as to drive the flash device to slide to the protruded position and to the stowed position.

Further, the driving mechanism may be arranged to include a driven member which is arranged to be driven by the driving member to swing on a vertically extending shaft in such a way as to drive an illuminating angle varying member provided at the flash device.

By such an arrangement, the driving mechanism for driving the flash device to be protruded or to be stowed and for varying the illuminating angle of the flash device can be compactly arranged close to the flash device. The arrangement according to the present embodiment thus permits spaces available within the camera body to be efficiently used for reduction in size of the camera. According to the arrangement of the present embodiment, the driving cam 15 is arranged to drive in common not only the driving lever 16 and the flash-device driving lever 17 for protruding and stowing the flash light emitting part 20 but also the follower lever 21 and the zoom driving lever 22 for performing the illuminating-angle-varying driving action. Therefore, the driving forces to be used for protruding and stowing the flash light emitting part 20 and to be used for varying the illuminating angle can be transmitted and received by only one shaft 14 through a lens driving mechanism (the reduction gear train (5 to 9), etc.) disposed on one side of the photo-taking lens barrel 2 in the lower portion of the camera body 1. The arrangement, unlike the conventional arrangement, obviates the necessity of a complex driving mechanism which is arranged within the camera to receive a driving force for driving a flash light emitting part to be protruded and to be stowed from the side of a photo-taking lens and to receive another driving force for varying the illuminating angle from the side of a viewfinder. The arrangement, therefore, not only permits simplification of the driving mechanism for the whole camera but allows a greater amount of latitude in allocating the flash light emitting part.

Further, the slide cam 15b and the zoom cam 15c of the driving cam 15 are arranged to be not continuous in the direction of working rotation of the driving cam 15. Therefore, the cam shape of the slide cam 15b and that of the zoom cam 15c can be freely set according to the amount of movement of the flash light emitting part 20 to the protruded and stowed positions and according to the amount of variation of the illuminating angle as desired. Conversely speaking, the amount of movement of the flash light emitting part 20 and the amount of variation of the illuminating angle can be freely set as desired.

What is claimed is:

1. A camera comprising:
    a) a flash light emitting part arranged to be movable between a stowed position and a usage position;
    b) a first lever member arranged to swing in such a way as to cause said flash light emitting part to move from the stowed position to the usage position and from the usage position to the stowed position;
    c) a second lever member arranged to swing in such a way as to vary an illuminating angle of said flash light emitting part by moving a part of said flash light emitting part, when said flash light emitting part is in the usage position; and
    d) a rotating member arranged to rotate according to movement of a lens barrel, wherein a first engaging part arranged to engage said first lever member and a second engaging part arranged to engage said second lever member are formed at said rotating member.

2. A camera according to claim 1, wherein said first lever member, said second lever member and said rotating member swing or rotate around axes perpendicular to an optical axis of said lens barrel.

3. A camera according to claim 1, wherein the usage position of said flash light emitting part is a position where said flash light emitting part is protruded from a minor side of said camera.

4. A camera according to claim 1, wherein a gear-tooth part and a cam part are continuously formed at said first engaging part of said rotating member.

5. A camera according to claim 4, wherein a gear-tooth part is formed at said first lever member, and said gear-tooth part formed at said first lever member is arranged to mesh with the gear-tooth part formed at said first engaging part of said rotating member and to slidingly move along the cam part formed at said first engaging part of said rotating member.

6. A camera according to claim 1, wherein a cam part having an approximately involute curved shape is formed at said first engaging part of said rotating member.

7. A camera according to claim 6, wherein a gear-tooth part is formed at the involute curved shape portion of the cam part formed at said first engaging part of said rotating member.

8. A camera according to claim 7, wherein a gear-tooth part is formed at said first lever member, and said gear-tooth formed at said first lever member is arranged to mesh with the gear-tooth part formed at said first engaging part of said rotating member and to slidingly move along the cam part formed at said first engaging part of said rotating member.

9. A camera according to claim 8, wherein the gear-tooth part of said rotating member is formed in such a way as to cause the gear-tooth part of said first lever member and the gear-tooth part of said rotating member to mesh with each other when said lens barrel moves from a non-photo-taking position to a photo-taking position.

10. A camera according to claim 1, wherein a cam is formed at said second engaging part of said rotating member, and a cam follower part arranged to trace said cam is formed at said second lever member.

11. A camera according to claim 1, wherein said flash light emitting part includes an optical member having a cylindrical lens surface formed thereon, and, when said flash light emitting part is in the usage position, said second lever member engages said optical member, and, when said flash light emitting part is in the stowed position, said second lever member disengages from said optical member.

12. A camera according to claim 1, wherein said first lever member, said second lever member and said rotating member are disposed along a lower side of said flash light emitting part.

13. A camera comprising:
    a) a flash light emitting part arranged to be movable between a stowed position and a usage position;
    b) a lever member arranged to swing in such a way as to cause said flash light emitting part to move from the stowed position to the usage position and from the usage position to the stowed position, a gear-tooth part being formed at said lever member; and
    c) a rotating member arranged to rotate according to movement of a lens barrel, wherein a gear-tooth part arranged to mesh with the gear-tooth part of said lever member and a cam part along which the gear-tooth part of said lever member slidingly moves are continuously formed at said rotating member.

14. A camera according to claim 13, wherein the usage position of said flash light emitting part is a position where said flash light emitting part is protruded from a minor side of said camera.

15. A camera according to claim 13, wherein a cam having an approximately involute curved shape is formed at the cam part formed at said rotating member.

16. A camera according to claim 15, wherein the gear-tooth formed at said rotating member is formed on the involute curved shape portion of the cam part.

17. A camera according to claim 13, wherein said lever member and said rotating member swing or rotate around axes perpendicular to an optical axis of said lens barrel.

18. A camera according to claim 13, wherein said lever member and said rotating member are disposed along a lower side of said flash light emitting part.

19. A camera according to claim 13, wherein the gear-tooth part of said rotating member is formed in such a way as to cause the gear-tooth part of said lever member and the gear-tooth part of said rotating member to mesh with each other when said lens barrel moves from a non-photo-taking position to a photo-taking position.

20. A camera comprising:
    a) a flash light emitting part arranged to be movable between a stowed position and a usage position;
    b) a lever member arranged to swing in such a way as to cause said flash light emitting part to move from the stowed position to the usage position and from the usage position to the stowed position; and
    c) a rotating member arranged to engage said lever member and to rotate according to movement of a lens barrel, wherein said lever member and said rotating member are disposed along a lower side of said flash light emitting part.

21. A camera according to claim 20, wherein the usage position of said flash light emitting part is a position where said flash light emitting part is protruded from a minor side of said camera.

* * * * *

UNITED STATES PATENT AND TRADEMARK OFFICE
CERTIFICATE OF CORRECTION

PATENT NO.    : 6,404,988 B1
DATED         : June 11, 2002
INVENTOR(S)   : Minoru Tanabe It is certified that error appears in the above-identified patent and that said Letters Patent is hereby corrected as shown below:

Title page,
Item [30], Foreign Application Priority Data, delete "June 19, 1999" and insert -- June 25, 1999 --.

Signed and Sealed this

Twenty-eighth Day of October, 2003

JAMES E. ROGAN
*Director of the United States Patent and Trademark Office*